United States Patent
Dohi et al.

(10) Patent No.: US 6,646,494 B2
(45) Date of Patent: Nov. 11, 2003

(54) SEMICONDUCTOR INTEGRATED CIRCUIT DEVICE HAVING BOOSTING CIRCUIT

(75) Inventors: Yoshitsugu Dohi, Hyogo (JP); Akira Hosogane, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/987,838

(22) Filed: Nov. 16, 2001

(65) Prior Publication Data

US 2003/0006823 A1 Jan. 9, 2003

(30) Foreign Application Priority Data

Jul. 9, 2001 (JP) .................................. 2001-207784

(51) Int. Cl.[7] .............................. G05F 1/10; G05F 3/02
(52) U.S. Cl. ...................................................... 327/536
(58) Field of Search .............................. 327/536, 537; 363/59, 60

(56) References Cited

U.S. PATENT DOCUMENTS 6,026,049 A * 2/2000 Park ........................... 365/233
6,154,411 A * 11/2000 Morishita .................... 365/226
6,278,316 B1 * 8/2001 Tanzawa et al. ............. 327/536

FOREIGN PATENT DOCUMENTS

| JP | 9-308225 | 11/1997 |
|----|----------|---------|
| JP | 10-312695 | 11/1998 |
| JP | 11-273376 | 10/1999 |
| JP | 2000-149582 | 5/2000 |

* cited by examiner

Primary Examiner—Terry D. Cunningham
Assistant Examiner—Quan Tra
(74) Attorney, Agent, or Firm—McDermott, Will & Emery

(57) ABSTRACT

When a stage increasing signal, which is input into a sub boosting circuit, is at the L level, three boosting stages are used within the sub boosting circuit to boost a supply potential. On the other hand, when the stage increasing signal is at an H level, four boosting stages are used within the sub boosting circuit to boost the supply potential. Thus, by the semiconductor integrated circuit device of the invention, an internal potential can be boosted at a high speed while power consumption can be reduced.

3 Claims, 17 Drawing Sheets

SEMICONDUCTOR INTEGRATED CIRCUIT DEVICE HAVING BOOSTING CIRCUIT

BACKGROUND OF THE INVENTION

1. Field of the Invention

The present invention relates to a semiconductor integrated circuit device, and more particularly, to a semiconductor integrated circuit device including a boosting circuit boosting an internal potential level.

2. Description of the Background Art

FIG. 18 is a schematic block diagram showing the configuration of a high voltage generating circuit within a conventional semiconductor integrated circuit device.

Referring to FIG. 18, a high voltage generating circuit 10 includes, a main charge pump circuit 11, a sub charge pump circuit 12, a main charge pump limiting circuit 13, and a sub charge pump limiting circuit 14.

Sub charge pump circuit 12 boosts an external power-supply potential ext.Vcc, and outputs the boosted potential to main charge pump circuit 11 as a supply potential VWDP.

Main charge pump circuit 11 receives supply potential VWDP, and further boosts supply potential VWDP and outputs it as a boosted potential VPP. Boosted potential VPP is supplied to each internal circuit within the semiconductor integrated circuit device.

Sub charge pump limiting circuit 14 includes a differential amplifying circuit, determines whether or not supply potential VWDP has reached a predetermined potential level, and outputs the result of the determination as a determination signal CPW0. Similarly, main charge pump limiting circuit 13 determines whether or not boosted potential VPP has reached a predetermined potential level, and outputs the result of the determination as a determination signal CPWW. It is noted that, when boosted potential VPP has not yet reached a predetermined potential level, determination signal CPWW is output as a logic high or "H" level. On the other hand, when boosted potential VPP has already reached a predetermined potential level, determination signal CPWW is output as a logic low or "L" level.

Main charge pump circuit 11 receives an internal clock signal int.CLK2 output from a clock generating circuit 15, to perform boosting operation. Moreover, sub charge pump circuit 12 receives an internal clock signal int.CLK1 output from clock generating circuit 15 to perform boosting operation.

Clock generating circuit 15 receives an externally-input serial clock signal SC, and outputs internal clock signals int.CLK1 and int.CLK2.

Now, when a write voltage is generated in high voltage generating circuit 10 shown in FIG. 18, main charge pump circuit 11 uses supply potential VWDP output from sub charge pump circuit 12 to boost the potential level of boosted potential VPP.

At that moment, in order to increase a writing speed, a boosting speed of boosted potential VPP must be increased.

Furthermore, the potential of boosted potential VPP is raised as time passes, while sub charge pump circuit 12 continues operating even after boosted potential VPP attains to a potential level sufficient to perform the writing operation. This has caused a problem of large power consumption.

SUMMARY OF THE INVENTION

An object of the present invention is to provide a semiconductor integrated circuit device including a boosting circuit in which an internal potential can be boosted at a high speed while power consumption can be reduced.

According to one aspect of the present invention, a semiconductor integrated circuit device includes a booster boosting an internal potential level. The booster includes a first boosting circuit boosting the internal potential level, and a second boosting circuit boosting a level of a supply potential supplied to the first boosting circuit. The second boosting circuit includes a plurality of boosting stages for boosting the supply potential level, and a boost control circuit changing the number of the boosting stages to be operated.

By increasing the number of boosting stages to be operated within the second boosting circuit, the first boosting circuit can attain a higher boosting speed of the internal potential level.

Moreover, by reducing the number of boosting stages to be operated within the second boosting circuit, power consumption can be reduced.

Preferably, the boost control circuit changes the number of boosting stages to be operated after a predetermined time has elapsed from activation of the first boosting circuit.

Preferably, the boost control circuit includes a timer circuit, and the timer circuit performs time measurement after reception of an activation signal of the booster.

Thus, the number of boosting stages to be operated within the second circuit is reduced depending on boosting time of the internal potential level, resulting in reduction of power consumption.

Preferably, the semiconductor integrated circuit device further includes a determination circuit determining whether or not an internal potential level boosted by the booster is at a predetermined potential level. The boost control circuit changes the number of boosting stages to be operated, in response to a determination result of the determination circuit.

Thus, by reducing the number of boosting stages to be operated within the second boosting circuit when the internal potential level reaches a predetermined potential level, power consumption can be reduced.

According to another aspect of the present invention, a semiconductor integrated circuit device includes a booster boosting an internal potential level, a determination circuit determining whether or not an internal potential level boosted by the booster has reached a predetermined potential level, and a clock generating circuit receiving an external signal and generating an internal clock signal. The clock generating circuit stops generation of the internal clock signal when the determination circuit determines that the internal potential level has reached a predetermined potential level.

This allows reduction of power consumption.

Preferably, the semiconductor integrated circuit device includes a plurality of boosters, and a plurality of determination circuits provided for each of the boosters. The clock generating circuit stops generation of the internal clock signal when all of the determination circuits determine that a potential level boosted by each of the boosters is at a predetermined potential level.

Thus, the clock generating circuit continues operating until all of the potential levels boosted by the plurality of boosters reach a predetermined potential level.

Preferably, the clock generating circuit receives an activation signal generated from an external signal to start operating, and invalidates the activation signal when all of the determination circuits determine that the potential level boosted by each of the boosters is at a predetermined potential level.

Thus, the activation signal itself is invalidated, to stop the operation of the clock generating circuit.

Preferably, the clock generating circuit includes a plurality of clock frequency-dividing circuits each changing a frequency of the clock signal. Each of the clock frequency-dividing circuits invalidates the activation signal when all of the potential levels boosted by the plurality of boosters each receiving the clock signal of a same frequency reach a predetermined potential level.

This allows clock signals to be stopped for each group of boosters receiving clock signals of the same frequency.

As described above, in the high voltage generating circuit, the number of boosting stages operated within the sub charge pump is changed. As a result, the boosting speed for the boosted potential output from the main charge pump can be increased.

Moreover, when the boosted potential approaches a predetermined potential, the number of boosting stages operated within the sub charge pump is reduced. As a result, power consumption can be reduced.

Furthermore, when the boosted potential reaches a predetermined potential, the operation of the clock generating circuit is stopped. As a result, power consumption can further be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
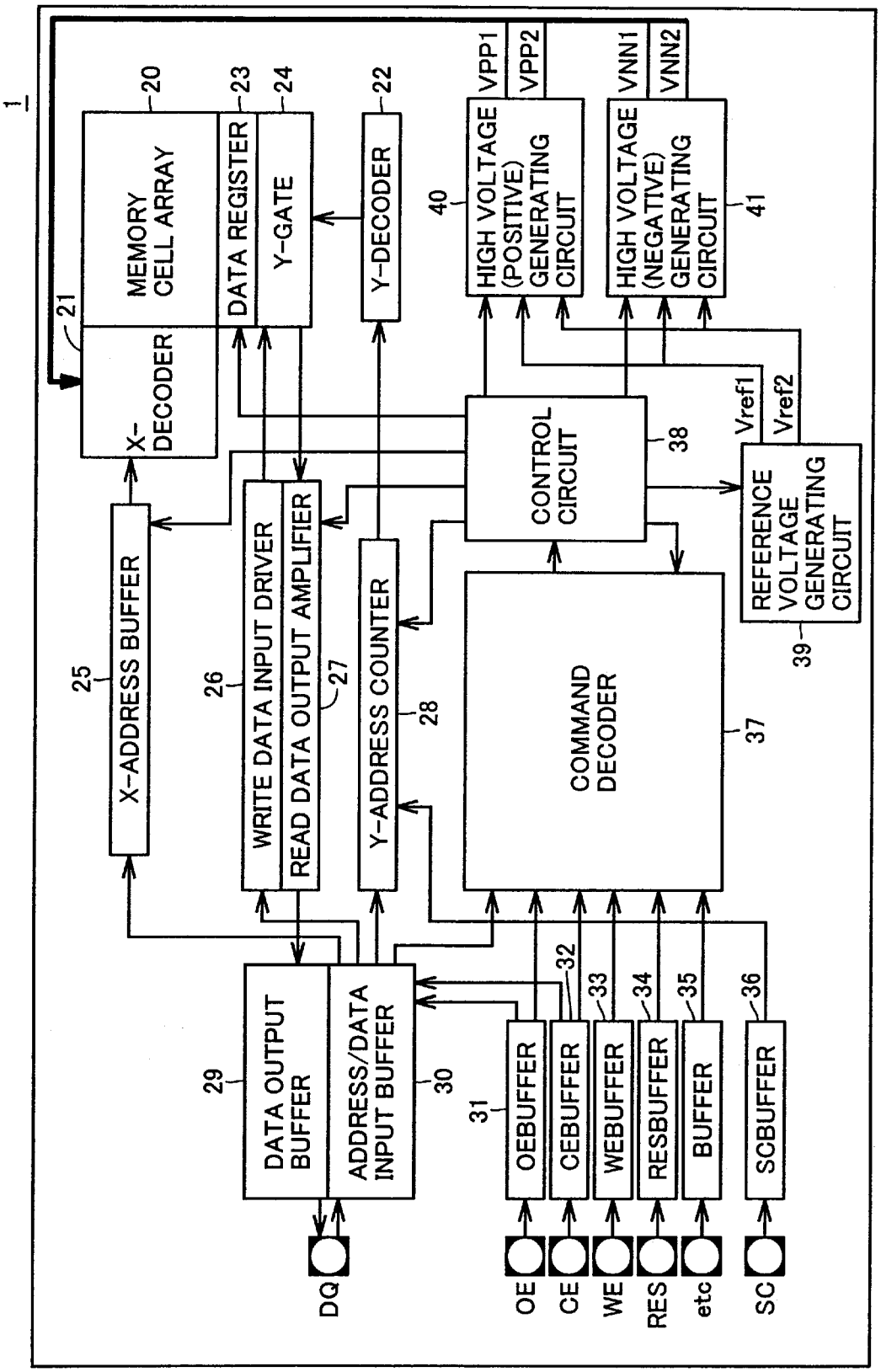
FIG. 1 is a schematic block diagram showing the configuration of a semiconductor integrated circuit device according to the first embodiment of the present invention.

Embodiments of the present invention will be described below in detail with reference to the drawings. It is noted that the same or corresponding portions are denoted by the same reference characters in the drawings, and the description thereof will not be repeated.

First Embodiment

FIG. 1 is a schematic block diagram showing the configuration of a semiconductor integrated circuit device according to the first embodiment of the present invention.

Referring to FIG. 1, semiconductor integrated circuit device 1 includes a memory cell array 20, an X-decoder 21, a Y-decoder 22, a data register 23, a Y-gate 24, an X-address buffer 25, a write data input driver 26, a read data output amplifier 27, a Y-address counter 28, a data output buffer 29, and an address/data input buffer 30.

Memory cell array 20 includes a plurality of memory cells, each of which stores 1-bit data. Each memory cell is arranged at a predetermined address determined by a row address and a column address. Memory cell array 20 further includes a word line WL provided corresponding to each row, and a bit-line pair BL and /BL provided corresponding to each column. One memory cell MC is arranged at one of two crossing points of two bit lines BL, /BL and one word line WL orthogonal thereto.

Address/data input buffer 30 transmits data, which is input from a data input/output terminal during a write mode, to data register 23 via write data input driver 26 and Y-gate 24.

Write data input driver 26 buffers the write data from address/data input buffer 30 and writes the data into data register 23 via Y-gate 24, in the write mode.

X-address buffer 25 receives an address signal supplied via data input/output terminal DQ and address/data input buffer 30, and outputs an internal address signal to X-decoder 21.

X-decoder 21 decodes the internal address signal output from X-address buffer 25, and selects a word line within the memory cell array.

Data register 23 includes register circuits provided corresponding to columns, and stores write data provided via Y-gate 24.

Y-address counter 28 performs step-by-step operation in accordance with internal clock signal int.CLK. This allows Y-address counter 28 to sequentially form internal Y-address signals, and to output the signals to Y-decoder 22.

Y-decoder 22 decodes the internal Y-address signals output from Y-address counter 28, and outputs each of the decoded signals as a bit-line selection signal.

Y-gate 24 receives the bit-line selection signal output from Y-decoder 22, and selectively connects data register 23 with write data input driver 26 or read data output amplifier 27.

Data output buffer 29 outputs the data within data register 23 to the outside via Y-gate 24 and read data output amplifier 27.

Read data output amplifier 27 amplifies the data read from memory cell MC by reading operation, and outputs the amplified data to data output buffer 29.

Semiconductor integrated circuit device 1 further includes an OE buffer 31, a CE buffer 32, a WE buffer 33, a RES buffer 34, an etc buffer 35, and an SC buffer 36.

OE buffer 31 receives an output enable signal /OE input from a control signal input terminal, and outputs the signal as an internal signal. Likewise, CE buffer 32 receives a tip enable signal /CE input from a control input terminal, and outputs the signal as an internal signal. WE buffer 33 receives a write enable signal /WE input from a control signal input terminal, and outputs the signal as an internal signal. RES buffer 34 receives a reset signal RES, and outputs the received signal as an internal signal. SC buffer 36 receives a serial clock signal SC, and outputs the received signal as an internal signal. The etc buffer 35 receives another control signal, and outputs the received signal as an internal signal.

Semiconductor integrated circuit device 1 further includes a command decoder 37, a control circuit 38, a reference potential generating circuit 39, and high voltage generating circuits 40 and 41.

Command decoder 37 receives an internal control signal output from each of control signal buffers 31 to 36, and outputs a command to control circuit 38.

Control circuit 38 receives the command from command decoder 37, and performs writing operation, reading operation, erasing operation, and so forth. Control circuit 38 then controls reference potential generating circuit 39 and high voltage generating circuits 40, 41 in accordance with the performed operation.

Reference potential generating circuit 39 generates a plurality of reference potentials Vref, and transmits each of the generated potentials to each internal circuit. Reference potential generating circuit 39 outputs a reference potential Vref1 to high voltage (positive) generating circuit 40, and outputs a reference potential Vref2 to high voltage (negative) generating circuit 41.

High voltage (positive) generating circuit 40 outputs boosted potential VPP, the potential of which is boosted to be positive, to X-decoder 21. It is noted that, for boosted potential VPP, VPP1 and VPP2 having different potential levels are selectively output depending on the type of the operation of semiconductor integrated circuit device 1.

Moreover, high voltage (negative) generating circuit 41 outputs boosted potentials VNN1 and VNN2, the potential levels of which are boosted to be negative, to X-decoder 21.

Next, the circuit configuration of high voltage (positive) generating circuit 40 will be described. Note that, high voltage (negative) generating circuit 41 has a configuration similar to that of high voltage generating circuit 40, so that the description thereof will not be repeated. Hereinafter, the high voltage (positive) generating circuit is referred to as a high voltage generating circuit.

Figure 2:
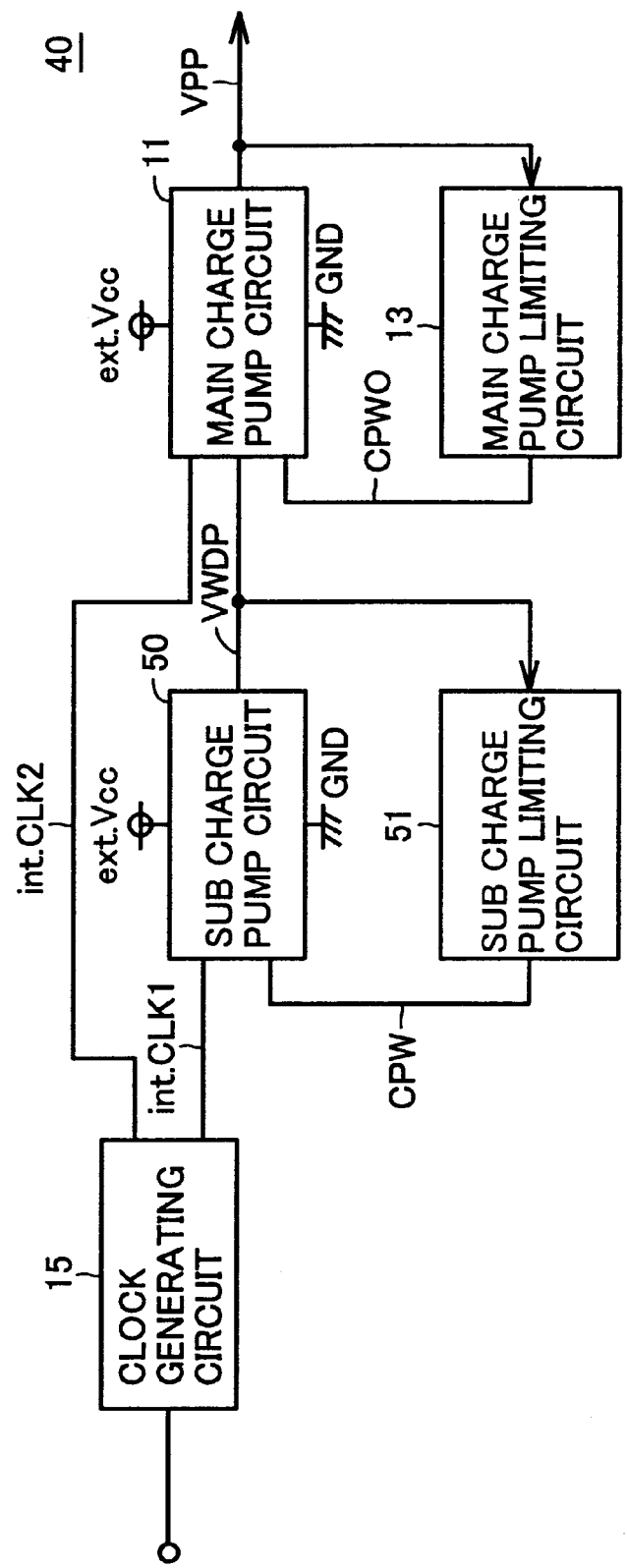
FIG. 2 is a schematic block diagram showing the configuration of a high voltage generating circuit according to the first embodiment of the present invention.

FIG. 2 is a schematic block diagram showing the configuration of the high voltage generating circuit according to the first embodiment of the present invention.

Figure 18:
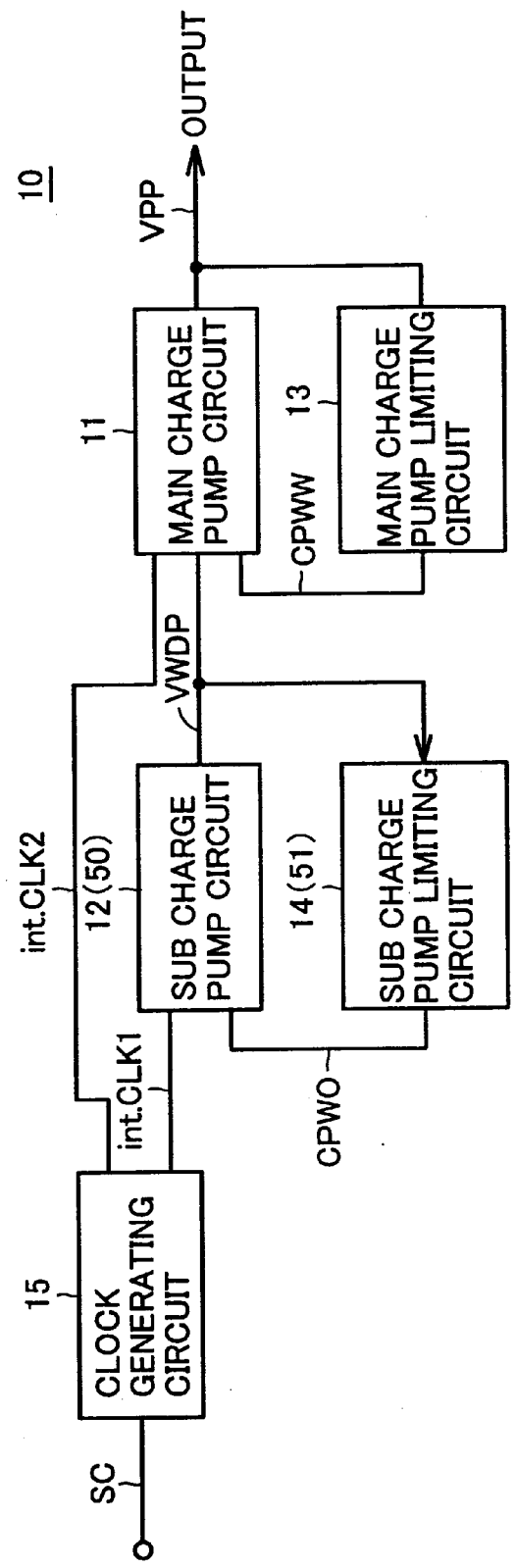
FIG. 18 is a schematic block diagram showing the configuration of the high voltage generating circuit within the conventional semiconductor integrated circuit device.

Referring to FIG. 2, high voltage generating circuit 40 includes, when compared to high voltage generating circuit 10 shown in FIG. 18, a sub charge pump circuit 50 in place of sub charge pump circuit 12, and a sub charge pump limiting circuit 51 in place of sub charge pump limiting circuit 14. The other parts are configured as in the case with FIG. 18, so that the description thereof will not be repeated.

Figure 3:
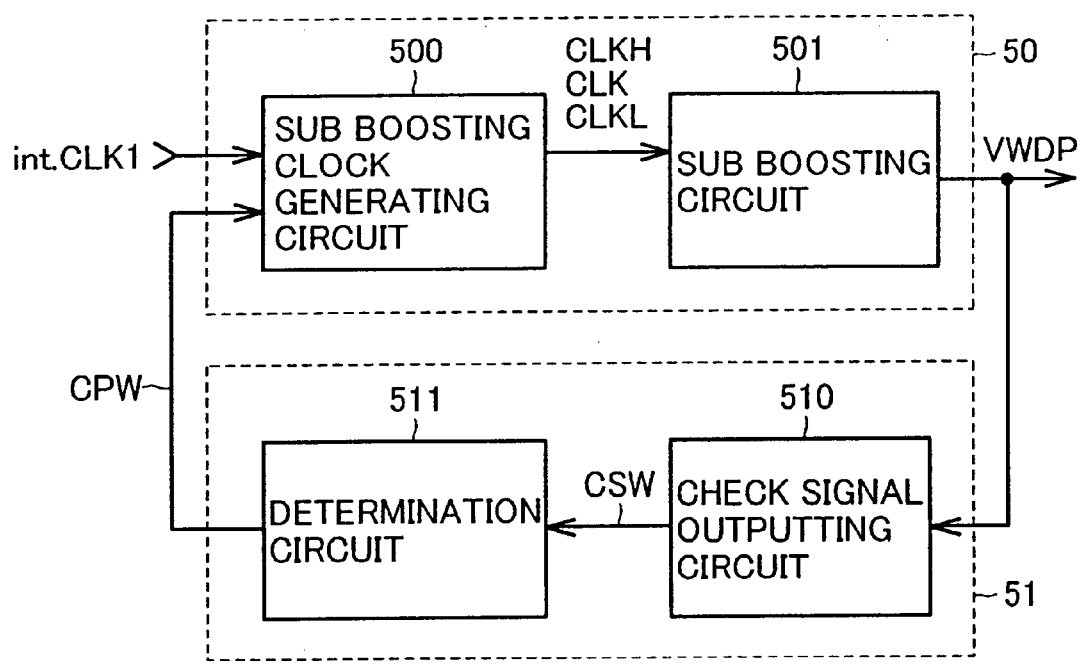
FIG. 3 is a block diagram showing the circuit configuration of a sub charge pump circuit and a sub charge pump limiting circuit shown in FIG. 2.

FIG. 3 is a block diagram showing the circuit configuration of sub charge pump circuit 50 and sub charge pump limiting circuit 51 shown in FIG. 2.

Referring to FIG. 3, sub charge pump limiting circuit 51 includes a check signal outputting circuit 510 and a determination circuit 511.

Check signal outputting circuit 510 outputs a check signal CSW to be used for determining whether or not supply potential VWDP has reached a predetermined potential level.

Determination circuit 511 determines whether or not supply potential VWDP has reached a predetermined potential level by comparing check signal CSW and reference potential Vref, and outputs the determined result as a determination signal CPW.

Sub charge pump circuit 50 includes a sub boosting clock generating circuit 500 and sub boosting circuit 501.

Sub boosting clock generating circuit 500 receives internal clock signal int.CLK1 output from clock generating circuit 15 and determination signal CPW, and outputs clock signals CLK, CLKH and CLKL to be boosted in sub boosting circuit 501. Sub boosting circuit 501 receives clock signals CLK, CLKH and CLKL, and outputs supply potential VWDP.

Figure 4:
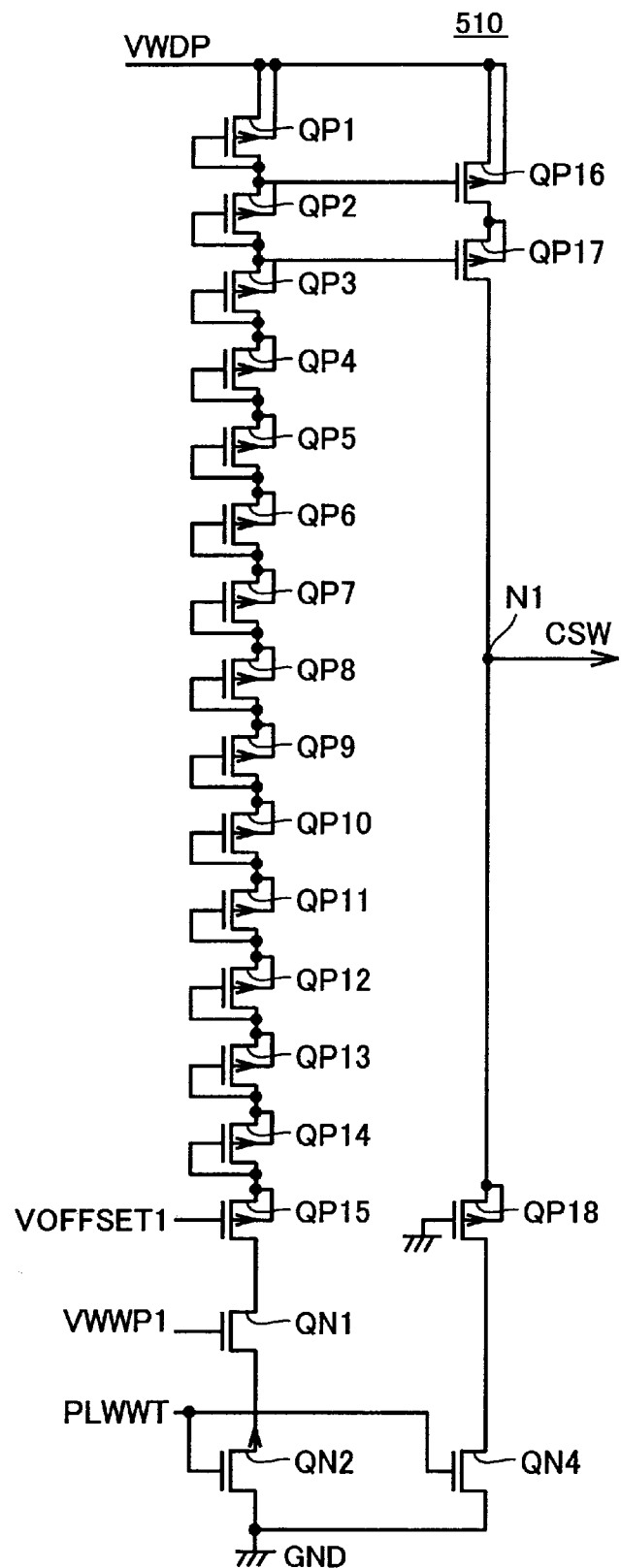
FIG. 4 is a circuit diagram showing the circuit configuration of a check signal outputting circuit shown in FIG. 3.

FIG. 4 is a circuit diagram showing the circuit configuration of check signal outputting circuit 510 shown in FIG. 3.

Referring to FIG. 4, check signal outputting circuit 510 includes P-channel MOS transistors QP1 to QP15, and N-channel MOS transistors QN1 and QN2 connected in series between a node receiving supply potential VWDP and a ground node GND. Check signal outputting circuit 510 further includes P-channel MOS transistors QP16 to QP18, and an N-channel MOS transistor QN4 connected in series between the node receiving supply potential VWDP and ground node GND.

The source of transistor QP1 is connected to the node receiving supply potential VWDP. Moreover, transistors QP1 to QP15 are connected in series. Transistors QP1 to QP14 are diode connected, respectively.

A signal VOFFSET1 for determining the potential level of check signal CSW is input into the gate of transistor QP15.

Sigal VOFFSET1 is generated in command decoder 37.

Transistors QN1 and QN2 are connected in series. The drain of transistor QN1 is connected to the drain of transistor QP15. The source of transistor QN2 is connected to ground node GND.

A stage increasing signal VWWP1, which will be described later, is input into the gate of transistor QN1.

A limiting circuit activation signal PLWWT for operating sub charge pump limiting circuit 51 is input into the gate of transistor QN2.

Limiting circuit activation signal PLWWT is generated in command decoder 37.

Transistors QP16 and QP17 are connected in series. The source of transistor QP16 is connected to the node receiving supply potential VWDP, and the gate thereof is connected to the drain of transistor QP1. The gate of transistor QP17 is connected to the drain of transistor QP2.

Transistors QP17, QP18 and QN4 are connected in series.

The source of transistor QP18 is connected to the drain of transistor QP17. Moreover, the drain of transistor QP18 is connected the drain of the transistor QN4. The gate of transistor QP18 is connected to ground node GND.

The source of transistor QN4 is connected to ground node GND, and limiting circuit activation signal PLWWT is input into the gate thereof.

Check signal outputting circuit 510 outputs check signal CSW from a node N1 which is a connecting point of transistors QP17 and QP18.

Now, the operation of check signal outputting circuit 510 is described.

When the potential level of supply potential VWDP output from sub charge pump circuit 50 is higher than the total of threshold values of transistors QP1 to QP15, QN1, and QN2, a signal of the L level is input into the gates of transistors QP16 and QP17. This allows check signal CSW output from node N1 to be at the H level.

Figure 5:
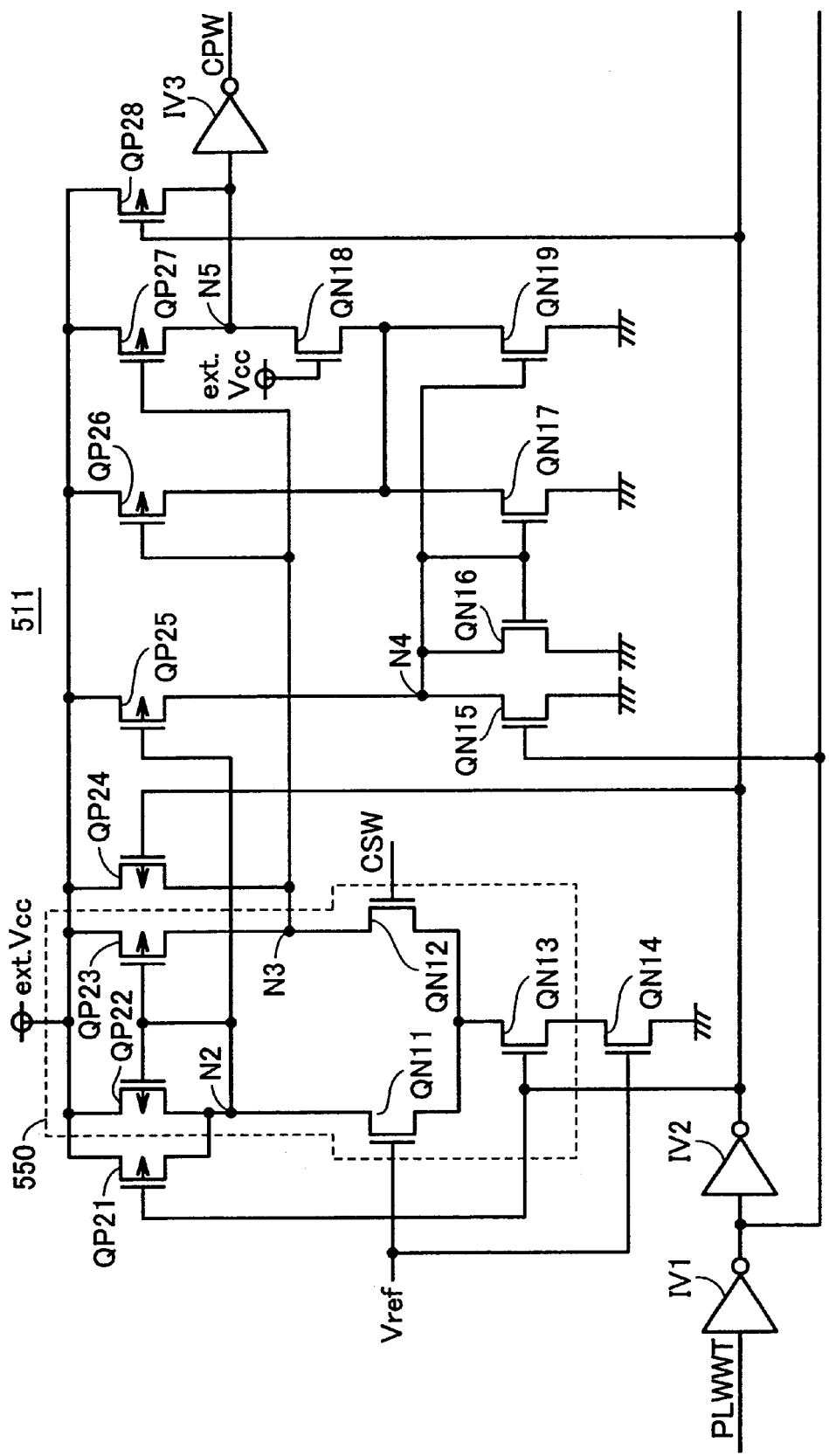
FIG. 5 is a circuit diagram showing the circuit configuration of a determination circuit shown in FIG. 3.

FIG. 5 is a circuit diagram showing the circuit configuration of determination circuit 511 shown in FIG. 3.

Referring to FIG. 5, determination circuit 511 includes inverters IV1 to IV3, P-channel MOS transistors QP21 to QP28, and N-channel MOS transistors QN11 to QN19.

P-channel MOS transistors QP21 to QP24 and N-channel MOS transistors QN11 to QN14 are connected between a node receiving external power-supply potential ext.Vcc and the ground node. Transistors QP22, QP23 and QN11 to QN13 constitute a current miller amplifier 550. Reference potential Vref is input into the gate of transistor QN11, and check signal CSW is input into the gate of transistor QN12. The gates of transistors QP22 and QP23 are connected to a node N2. Transistor QN14 is connected between transistor QN13 and ground node GND, and reference potential Vref is input into the gate of transistor QN14. Moreover, an output signal of inverter IV2 is input into the gate of transistor QN13. The source of transistor QP21 is connected to the node receiving external power-supply potential ext.Vcc, and the drain thereof is connected to node N2. Furthermore, the output signal of inverter IV2 is input into the gate of transistor QP21.

The source of transistor QP23 is connected to the node receiving external power-supply potential ext.Vcc, and the drain thereof is connected to a node N3. Moreover, the gate of transistor QP23 is connected to node N2.

The source of transistor QP24 is connected to the node receiving external power-supply potential ext.Vcc, and the drain thereof is connected to node N3. Moreover, the output signal of inverter IV2 is input into the gate of transistor QP24.

Transistors QP25 and QN15 are connected in series between the node receiving external power-supply potential ext.Vcc and ground node GND. The gate of transistor QP25 is connected to node N2, and an input signal of inverter IV1 is input into the gate of transistor QN15. The drain and gate of transistor QN16 is connected to a node N4, and the source thereof is connected to ground node GND.

Transistors QP26 and QN17 are connected in series between the node receiving external power-supply potential ext.Vcc and ground node GND. The gate of transistor QP26 is connected to node N3, and the gate of transistor QN17 is connected to node N4.

Transistors QP27, QN18 and QN19 are connected in series between the node receiving external power-supply potential ext.Vcc and ground node GND. The gate of transistor QP27 is connected to node N3, and the gate of transistor QN18 is connected to the node receiving external power-supply potential ext.Vcc. The gate of transistor QN19 is connected to node N4, and the drain thereof is connected to the drain of transistor QN17.

Transistor QP28 is connected between the node receiving external power-supply potential ext.Vcc and a node N5, and the output signal of inverter IV2 is input into the gate thereof.

Inverter IV3 is connected to node N5, to invert the input signal and outputs the inverted signal as determination signal CPW. Inverter IV1 receives and inverts limiting circuit activation signal PLWWT, and transmits the inverted signal to inverter IV2. Inverter IV2 receives and inverts the output signal of inverter IV1, and outputs the inverted signal.

Next, the operation of determination circuit 511 will be described.

While reference potential Vref is supplied to determination circuit 511, transistor QN14 is always turned on. If limiting circuit activation signal PLWWT is in an activated state (H level) at that moment, transistor QN13 is turned on. As a result, current miller amplifier 550 starts operating.

Current miller amplifier 550 compares reference potential Vref with check signal CSW. If check signal CSW is higher than reference potential Vref, i.e., if supply potential VWDP is higher than a predetermined potential level, the output signal of node N3 is at the L level. As a result, determination signal CPW output from inverter IV3 is also at the L level. On the other hand, if check signal CSW is lower than reference potential Vref, i.e., if supply potential VWDP is lower than a predetermined potential level, determination signal CPW output from inverter IV3 comes to be at the H level.

Figure 6:
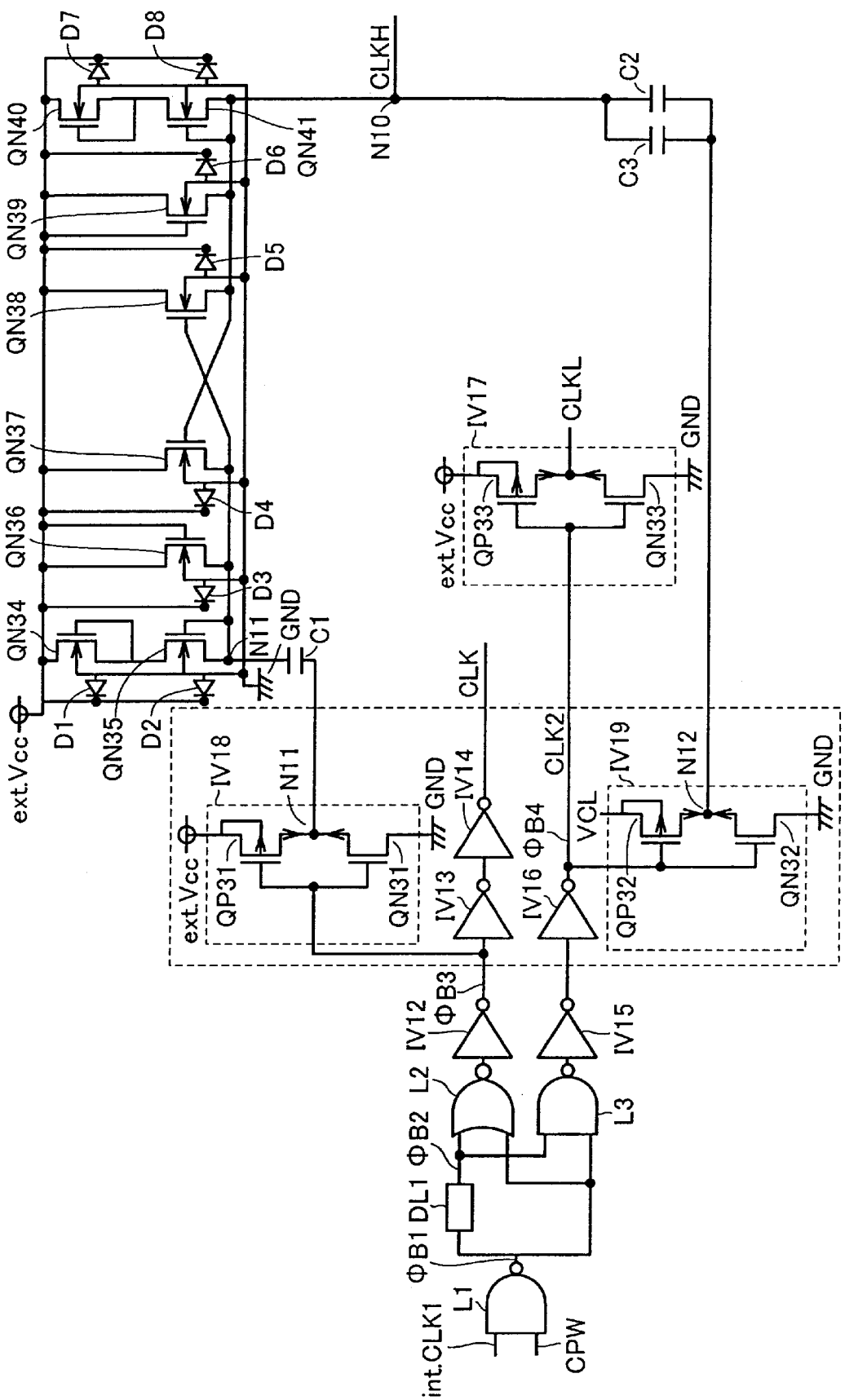
FIG. 6 is a circuit diagram showing the circuit configuration of a sub boosting clock generating circuit shown in FIG. 3.

FIG. 6 is a circuit diagram showing the circuit configuration of sub boosting clock generating circuit 500 shown in FIG. 3.

Referring to FIG. 6, sub boosting clock generating circuit 500 includes logic gates L1 to L3, inverters IV12 to IV19, N-channel MOS transistors QN34 to QN41, capacitors C1 to C3, and a delay circuit DL1.

Logic gate L1 receives internal clock signal int.CLK1 output from clock generating circuit 15 and determination signal CPW output from determination circuit 511, and outputs a signal $\phi B1$ as a result of an NAND logical operation. Delay circuit DL1 receives signal $\phi B1$, and outputs a signal $\phi B2$ obtained by delaying signal $\phi B1$. Logic gate L2 receives signals $\phi B1$ and $\phi B2$, and outputs the result of an NOR logical operation thereof. Logic gate L3 receives signals $\phi B1$ and $\phi B2$, and outputs the result of an NAND logical operation thereof.

Inverter IV12 receives and inverts an output signal of logic gate L2, and outputs the inverted signal as a signal $\phi B3$. Inverter IV13 receives and inverts signal $\phi B3$, and outputs the inverted signal. Inverter IV14 receives and inverts the output signal of inverter IV13, and outputs the inverted signal as a clock signal CLK.

Inverter IV15 inverts the signal output from logic gate L3 and outputs the inverted signal. Inverter IV16 receives and inverts the output signal of inverter IV15, and outputs the inverted signal as a signal $\phi B4$.

Inverter IV17 includes transistors QP33 and QN33. Inverter IV17 receives and inverts signal φB4, and outputs the inverted signal as a clock signal CLKL.

Inverter IV18 includes transistors QP31 and QN31. Signal φB3 is input into both of the gates of transistors QP31 and QN31. A node N11, which is a connecting point of transistors QP31 and QN31 is connected to one end of capacitor C1. The other end of capacitor C1 is connected to the source of transistor QN35.

Inverter IV19 includes transistors QP32 and QN32. Signal φB4 is input into both of the gates of transistors QP32 and QN32. A node N12, which is a connecting point of transistors QP32 and QN32 is connected to one end of each of capacitors C2 and C3. The other end of each of capacitors C2 and C3 is connected to a node N10.

Transistors QN34 and QN35 are connected in series, and the back gates thereof are both connected to ground node GND. Both of transistors QN34 and QN35 are diode connected.

The drain of transistor QN36 is connected to the node receiving external power-supply potential ext.Vcc, and the source thereof is connected to the source of transistor QN35. The gate of transistor QN36 is also connected to the node receiving external power-supply potential ext.Vcc. The drain of transistor QN37 is connected to the node receiving external power-supply potential ext.Vcc, and the source thereof is connected to the source of transistor QN35. Moreover, the gate of transistor QN37 is connected to the source of transistor QN38. The drain of transistor QN38 is connected to the node receiving external power-supply potential ext.Vcc, and the source thereof is connected to the source of transistor QN41. Moreover, the gate of transistor QN38 is connected to the source of transistor QN37. The drain of transistor QN39 is connected to the node receiving external power-supply potential ext.Vcc, and the source thereof is connected to the source of transistor QN41. The gate of transistor QN39 is also connected to the node receiving external power-supply potential ext.Vcc. Transistors QN40 and QN41 are connected in series, and both of transistors QN40 and QN41 are diode connected. The drain of transistor QN40 is connectd to the node receiving external power-supply potential ext.Vcc, and the source of transistor QN41 is connected to node N10.

The back gates of transistors QN34 to QN41 are all connected to ground node GND. Moreover, diode elements D1 to D8 are connected between the back gates of transistors QN34 to QN41 and the node receiving external power-supply potential ext.Vcc, respectively.

Subsequently, the operation of sub boosting clock generating circuit 500 will be described.

Sub boosting clock generating circuit 500 operates when determination signal CPW is at the H level, i.e., when supply potential VWDP has not reached a predetermined potential level.

When internal clock signal int.CLK1 is input, sub boosting clock generating circuit 500 outputs clock signals CLK, CLKD, CLKH and CLKL having pulse widths set by delay circuit DL1. Here, all of clock signals CLK, CLKD, CLKH and CLKL change in the same phase. In addition, clock signals CLK, CLKD and CLKL have the same potential level when they are at either one of the H and L levels. The potential level of clock signal CLKH at the H level is higher than external power-supply potential ext.Vcc, whereas the potential level of clock signal CLKH at the L level is the same as the potential level of clock signals CLK, CLKD and CLKL at the H level.

Figure 7:
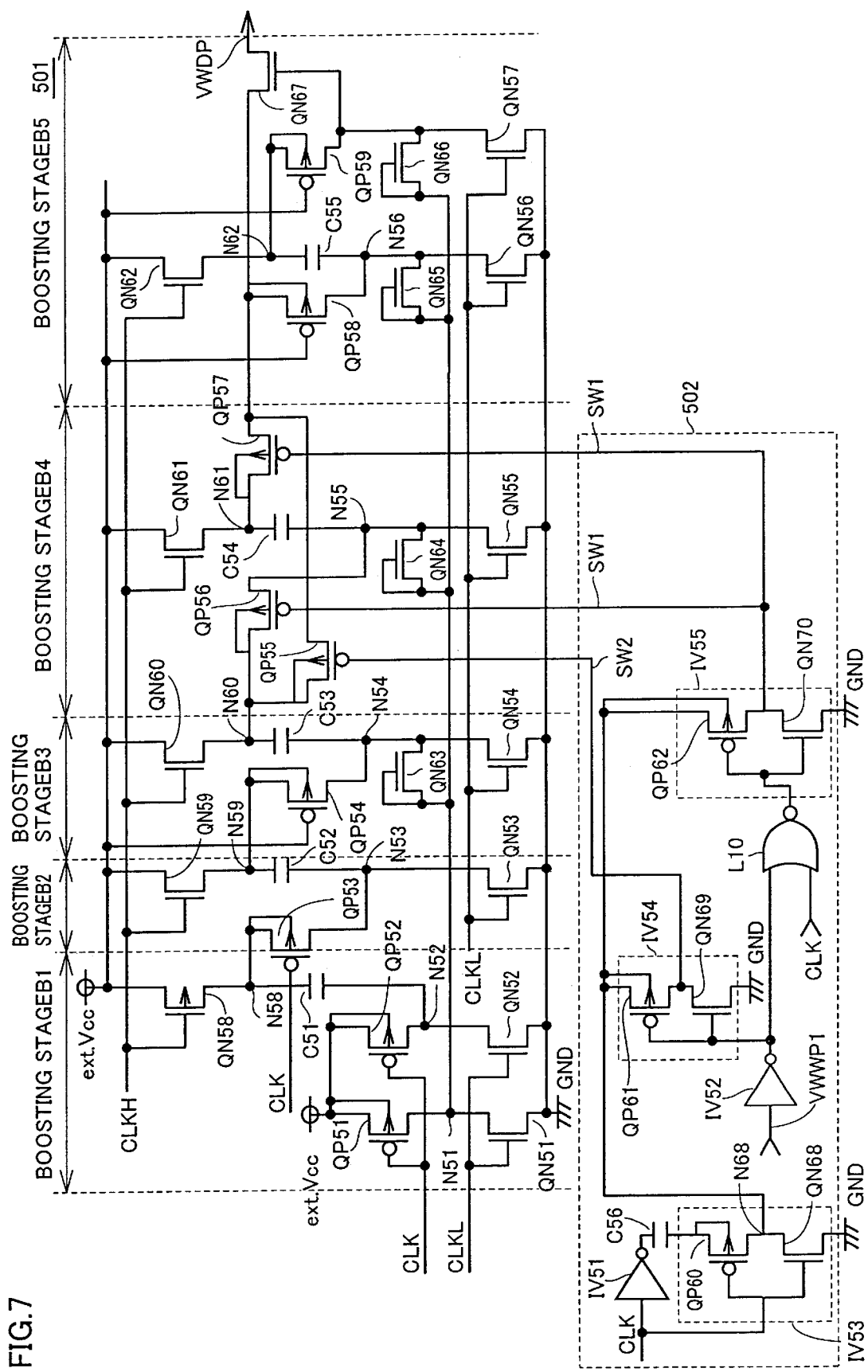
FIG. 7 is a circuit diagram showing the circuit configuration of a sub boosting circuit shown in FIG. 3.

FIG. 7 is a circuit diagram showing the circuit configuration of sub boosting circuit 501 shown in FIG. 3.

Referring to FIG. 7, sub boosting circuit 501 includes boosting stages B1 to B5 at which a potential level is boosted, and stage-number adjusting circuit 502 for changing the number of boosting stages to be operated.

Boosting stage B1 includes P-channel MOS transistors QP51 and QP52, N-channel MOS transistors QN51, QN52 and QN58, and a pumping capacitor C51. Transistors QP51 and QN51 are connected in series between the node receiving external power-supply potential ext.Vcc and ground node GND. The source of transistor QP51 is connected to the node receiving external power-supply potential ext.Vcc, and the source of transistor QN51 is connected to ground node GND. The gate of transistor QP51 receives clock signal CLK, whereas the gate of transistor QN51 receives clock signal CLKL. Moreover, transistors QP52 and QN52 are connected in series. The source of transistor QP52 is connected to the node receiving external power-supply potential ext.Vcc, and the source of transistor QN52 is connected to ground node GND. The gate of transistor QP52 receives clock signal CLK, whereas the gate of transistor QN52 receives clock signal CLKL.

Transistor QN58 and capacitor C51 are connected in series. The drain of transistor QN58 is connected to the node receiving external power-supply potential ext.Vcc, and one end of capacitor C51 is connected to a node N52. It is noted that node N52 is a connecting point of transistors QP52 and QN52. The gate of transistor QN58 receives clock signal CLKH.

Boosting stage B2 includes a P-channel MOS transistor QP53, N-channel MOS transistors QN53 and QN59, and a pumping capacitor C52.

Transistor QN59, capacitor C52 and transistor QN53 are connected in series between the node receiving external power-supply potential ext.Vcc and ground node GND. The drain of transistor QN59 is connected to the node receiving external power-supply potential ext.Vcc. The source of transistor QN53 is connected to ground node GND. The gate of transistor QN59 receives clock signal CLKH, whereas the gate of transistor QN53 receives clock signal CLKL.

Transistor QP53 is connected between a node N58 and a node N53. Node N58 is a connecting point of transistor QN58 and capacitor C51. Moreover, node N53 is a connecting point of capacitor C52 and transistor QN53. The gate of transistor QP53 receives clock signal CLK.

Boosting stage B3 includes a P-channel MOS transistor QP54, N-channel MOS transistors QN60, QN63 and QN54, and a pumping capacitor C53.

Transistor QN60, capacitor C53 and transistor QN54 are connected in series between the node receiving external power-supply potential ext.Vcc and the ground node. The drain of transistor QN60 is connected to the node receiving external power-supply potential ext.Vcc, and the gate thereof receives clock signal CLKH. The source of transistor QN54 is connected to ground node GND, and the gate thereof receives clock signal CLKL. Transistor QP54 is connected between nodes N59 and N54. Node N59 is a connecting point between transistor QN59 and capacitor C52, and node N54 is a connecting point between capacitor C53 and transistor QN54. The gate of transistor QP54 receives external power-supply potential ext.Vcc. The source of transistor QN63 is connected to node N54, and the gate and drain thereof are both connected to a node N51. Node N51 is a connecting point of transistor QP51 and transistor QN51.

Boosting stage B4 includes P-channel MOS transistors QP55 to QP57, N-channel MOS transistors QN61, QN64 and QN55, and a pumping capacitor C54.

Transistor QN61, capacitor C54 and transistor QN55 are connected in series between the node receiving external power-supply potential ext.Vcc and ground node GND. The drain of transistor QN61 is connected to the node receiving external power-supply potential ext.Vcc, and the gate thereof receives clock signal CLKH. Moreover, the source of transistor QN55 is connected to ground node GND, and the gate thereof receives clock signal CLKL. The source of transistor QN64 is connected to a node N55. Node N55 is a connecting point between capacitor C54 and transistor QN55. The gate and drain of transistor QN64 are both connected to node N51.

Transistor QP56 is connected between nodes N60 and N55. Here, node N60 is a connecting point of transistor QN60 and capacitor C53. A switch signal SW1 output from stage-number adjusting circuit 502 is input into the gate of transistor QP56. The source of transistor QP55 is connected to node N60, and the drain thereof is connected to the source of transistor QP58, which will be described later. A switch signal SW2 output from stage-number adjusting circuit 502 is input into the gate of transistor QP55. The source of transistor QP57 is connected to a node N61. Node N61 is a connecting point of the transistor QN61 and capacitor C54. The drain of transistor QP57 is connected to the source of transistor QP58, and switch signal SW1 output from stage-number adjusting circuit 502 is input into the gate of transistor QP57.

Boosting stage B5 includes P-channel MOS transistors QP58 and QP59, N-channel MOS transistors QN56, QN57, QN62, and QN65 to QN67, and a pumping capacitor C55.

Transistor QN62, capacitor C55 and transistor QN56 are connected in series between the node receiving external power-supply potential ext.Vcc and the ground node. The drain of transistor QN62 is connected to the node receiving external power-supply potential ext.Vcc, and the gate thereof receives clock signal CLKH. The source of transistor QN56 is connected to ground node GND, and the gate thereof receives clock signal CLKL. The source of transistor QP58 is connected to the drain of transistor QP57, and the drain of transistor QP58 is connected to a node N56. Here, node N56 is a connecting point of transistor QN56 and capacitor C55. The gate of transistor QP58 receives external power-supply potential ext.Vcc. The source of transistor QN65 is connected to node N56, and the gate and drain thereof are both connected to node N51.

Transistor QP59 and transistor QN57 are connected in series. The source of transistor QP59 is connected to a node N62. Node N62 is a connecting point of transistor QN62 and capacitor C55. The source of transistor QN57 is connected to ground node GND. External power-supply potential ext.Vcc is input into the gate of transistor QP59 and clock signal CLKL is input into the gate of transistor QN57. The source of transistor QN66 is connected to the drain of transistor QN57, and the gate and drain thereof are both connected to node N51.

The drain of transistor QN67 is connected to the source of transistor QP58, and the gate thereof is connected to the drain of transistor QP59. Supply potential VWDP is output from the source of transistor QN67.

Stage-number adjusting circuit 502 includes inverters IV51 to IV55, a pumping capacitor C56, and a logic gate L10.

Inverter IV53 includes a P-channel MOS transistor QP60 and an N-channel MOS transistor QN68 connected in series. Both of the gates of transistors QP60 and QN68 receive clock signal CLK. The source of transistor QN68 is connected to ground node GND. The source of transistor QP60 is connected to one end of capacitor C56. The other end of capacitor C56 is connected to inverter IV51. Clock signal CLK is input into inverter IV51, which inverts the signal and transmits the inverted signal to capacitor C56. Inverter IV53 outputs, from node N68, a signal having a potential level boosted by capacitor C56, when the clock signal is at the L level.

Inverter IV 52 receives and inverts a stage increasing signal VWWP1, and outputs the inverted signal to inverter IV54. It is noted that stage increasing signal VWWP1 is generated from an external signal by command decoder 37.

Inverter IV54 includes a P-channel MOS transistor QP61 and an N-channel MOS transistor QN69. The gates of transistors QP61 and QN69 both receive an output signal of inverter IV52. The source of transistor QP61 is connected to a node N68. Moreover, the drain of transistor QN69 is connected to ground node GND.

Inverter IV54 outputs switch signal SW2 of the H level, when stage increasing signal VWWP1 is activated to be at the H level.

Logic gate L10 outputs the result of an NOR logical operation of the output signal of inverter IV52 and clock signal CLK. Inverter IV55 includes a P-channel MOS transistor QP62 and an N-channel MOS transistor QN70. The source of transistor QP62 is connected to a node N68, and the source of transistor QN70 is connected to ground node GND. The gates of transistors QP62 and QN70 both receive the output signal of logic gate L10.

Inverter IV55 outputs switch signal SW1 of the L level, when stage increasing signal VWWP1 is activated to be at the H level and clock signal CLK is at the L level.

The operation of sub boosting circuit 501 having the circuit configuration above will be described.

Now, it is assumed that the potential level of supply potential VWDP output from sub charge pump circuit 50 has not yet reached a predetermined potential level. Sub charge pump limiting circuit 51 then outputs determination signal CPW of the H level.

Here, sub boosting clock generating circuit 500 outputs clock signals CLK, CLKL, CLKH in the same phase. Thus, sub boosting circuit 501 boosts external power-supply potential ext.Vcc to raise the potential level of supply potential VWDP.

When stage increasing signal VWWP1 is not activated, switch signal SW2 output from inverter IV54 within stage-number adjusting circuit 502 always remains at the L level. On the other hand, switch signal SW1 output from inverter IV55 always remains at the H level.

Thus, transistor QP55 is turned on, whereas transistors QP56 and QP57 are turned off in boosting stage B4. Therefore, boosting stage B4 performs no boosting operation.

As a result of the above, sub boosting circuit 501 boosts supply potential VWDP at three boosting stages B1 to B3.

Now, the boosting operation of sub boosting circuit 501 is described.

When clock signals CLK, CLKL and CLKH are at the L level, transistors QP51 and QP52 within boosting stage B1 is turned on, whereas transistors QN51 and QN52 are turned off. As a result, the potential level of nodes N51 and N52 is approximately the same as external power-supply potential ext.Vcc. This raises the potential level of one end of capacitor C51 from 0V to external power-supply potential ext.Vcc, so that the potential level of node N58, i.e. the other end of capacitor C51, is raised. Here, the raised potential level at node N58 is assumed to be P1. It is noted that transistor QN58 remains off.

Transistor QP53 is turned on, and therefore the potential level of node N58 comes to be almost equal to the potential level of node N53 within boosting stage B2. Thus, the potential level of node N58 is also P1, wherein P1>ext.Vcc.

The potential level of node N53, i.e. one end of capacitor C52, within boosting stage B2 is P1, so that the potential level of node N59, i.e. the other end of capacitor C52, is raised to be at the potential level of P2. Here, P2>P1 is attained.

In boosting stage B3, the potential level of external power-supply potential ext.Vcc is applied to the gate of transistor QP54, and the potential level of P2 is applied to the source thereof. Thus, transistor QP54 is turned on. As a result, the potential level of node N60 within boosting stage B3 is raised to be a potential level of P3, wherein P3>P2.

In boosting stage B4, transistor QP55 is turned on, whereas transistors QP56 and QP57 are both turned off, and thus no boosting operation is performed.

In boosting stage B5, transistor QP58 is turned on for the same reason as the case with transistor QP54, so that node N60 is connected to node N56 via transistors QP55 and QP58.

Therefore, the potential level of node N62 is boosted. Node N62 here has the potential level of P5, wherein P5>P3.

When node N62 reaches the potential level of P5, transistors QP59 and QN67 are both turned on. As a result, supply potential VWDP output from sub boosting circuit 501 has the potential level of P3.

Next, when clock signals CLK, CLKL, CLKH are at the H level, transistors QN58 to QN62 receiving clock signal CLKH, and transistors QN51 to QN57 receiving clock signal CLKL are turned on. On the other hand, transistors QP51 to QP53 receiving clock signal CLK are turned off.

Thus, the potential level of node N52 within boosting stage B1 is lowered to be at the level of ground potential GND. Whereas, transistor QN58 is turned on, so that node N58 comes to have the potential level of external power-supply potential ext.Vcc.

Likewise, nodes N53, N54 and N56 have the potential level of ground potential GND, whereas nodes N59, N60 and N62 have the potential level of external power-supply potential ext.Vcc.

As clock signals CLK, CLKL and CLKH described above change cyclically, sub boosting circuit 501 boosts potential level P3 of node N60.

By the operation described above, when stage increasing signal VWWP1 is not activated, boosting operation is performed by boosting stages B1 to B3 within sub boosting circuit 501.

Subsequently, when stage increasing signal VWWP1 is activated, switch signal SW2 output from inverter IV54 within stage-number adjusting circuit 502 comes to have the H level.

The potential level of the signal output from inverter IV54 here is higher than the potential level of node N60, due to inverter IV53.

In addition, when clock signal CLK is at the L level, switch signal SW1 output from logic gate L10 is at the L level.

Thus, when clock signal CLK is at the L level, transistor QP55 within boosting stage B4 is turned off, whereas transistors QP56 and QP57 are both turned on. As a result, boosting stage B4 performs boosting operation.

Subsequently, the boosting operation of sub boosting circuit 501 will be described.

When clock signals CLK, CLKL and CLKH are at the L level, the operation from boosting stages B1 to B3 are the same as the operation as in the case where stage increasing signal VWWP1 is inactive, so that the description thereof will not be repeated.

Subsequently, in boosting stage B4, transistor QP56 is turned on whereas transistor QP55 is turned off, so that node N60 is connected to node N55. Thus, node N55 has a potential level of P3.

This raises the potential level of one end of capacitor C54 from the level of ground potential level GND to P3. Thus, due to capacitance coupling, the potential level of node N61 is boosted. Assuming that the boosted potential level is P4, P4>P3 is attained.

Furthermore, transistors QP57 and QP58 are both turned on, so that node N61 is connected to node N56. Thus, node N56 has the potential level of P4.

Therefore, in boosting stage B5, the potential level of node N62 is boosted by capacitance coupling. Assuming that the potential level here is P6, P6>P4 is attained.

Hence, transistors QP59 and QN67 are both turned on. Transistor QN67 is connected to node N61 via transistor QP57, so that the potential level of supply potential VWDP output from sub boosting circuit 501 has the potential level of P4.

When clock signals CLK, CLKL and CLKH are at the H level, the same operation is performed as in the case where stage increasing signal VWWP1 is inactive, so that the description thereof will not be repeated.

As clock signals CLK, CLKL and CLKH described above change cyclically, sub boosting circuit 501 boosts potential level P4 of node N61.

By the operation described above, when stage increasing signal VWWP1 is activated, boosting operation is performed by four boosting stages B1 to B4 within sub boosting circuit 501. Therefore, the potential level of supply potential VWDP is raised, compared to the case where stage increasing signal VWWP1 is inactive.

As a result, the boosting speed of the potential level of boosted potential VPP output from main charge pump circuit 11 can be increased.

Second Embodiment

In order to increase the boosting speed of the main charge pump, it is effective to increase supply potential VWDP output from the sub charge pump. However, if supply potential VWDP is held at the high potential level when boosted potential VPP output from the main charge pump approaches a predetermined potential level, power consumption will be undesirably increased.

Thus, the potential level of supply potential VWDP is preferably lowered at the time point where boosted potential VPP has come close to a predetermined potential level.

Figure 8:
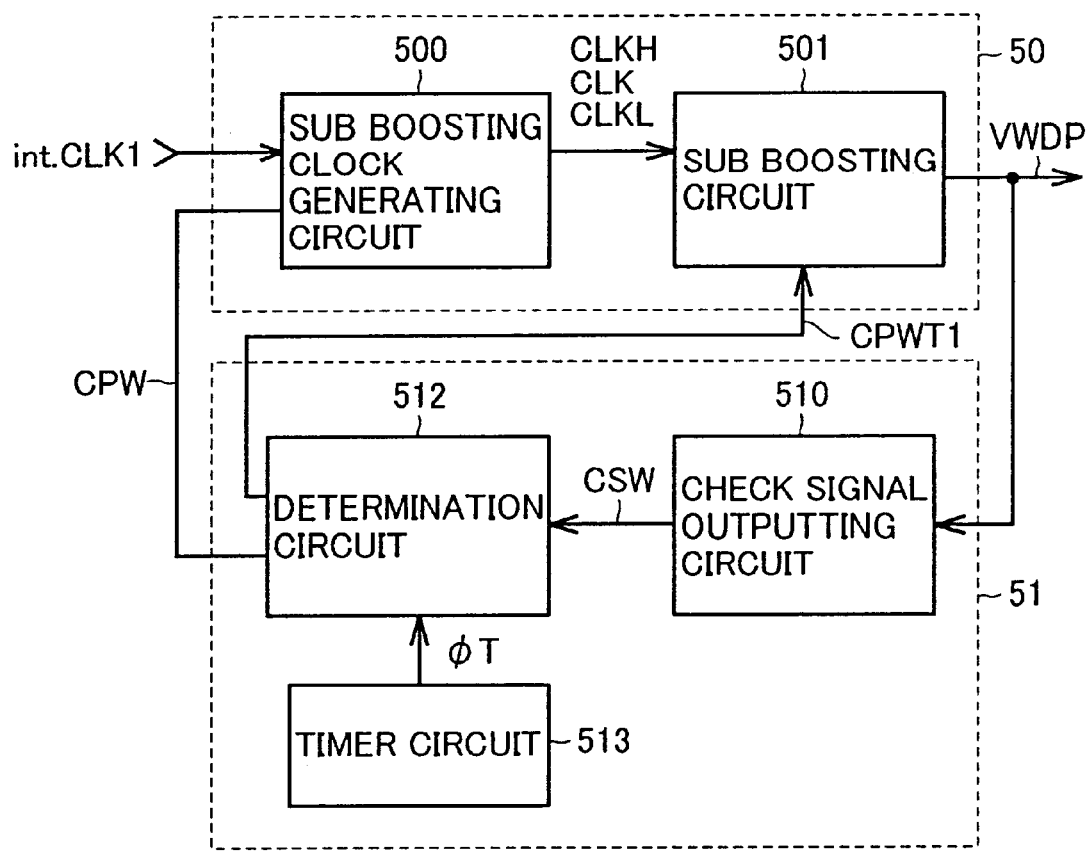
FIG. 8 is a block diagram showing the schematic configuration of a sub charge pump circuit and a sub charge pump limiting circuit according to the second embodiment.

FIG. 8 is a block diagram showing the schematic configuration of sub charge pump circuit 50 and sub charge pump limiting circuit 51 according to the second embodiment.

Referring to FIG. 8, sub charge pump circuit 50 has the same configuration as that shown in FIG. 3, and hence includes sub boosting clock generating circuit 500 and sub boosting circuit 501. However, instead of stage increasing signal VWWP1, a stage-number changing signal CPWT1 output from a determination circuit 512, which will be described later, is input into sub boosting circuit 501.

Sub charge pump limiting circuit 51 includes determination circuit 512 in place of determination circuit 511 in FIG. 3, and further includes a timer circuit 513.

Figure 9:
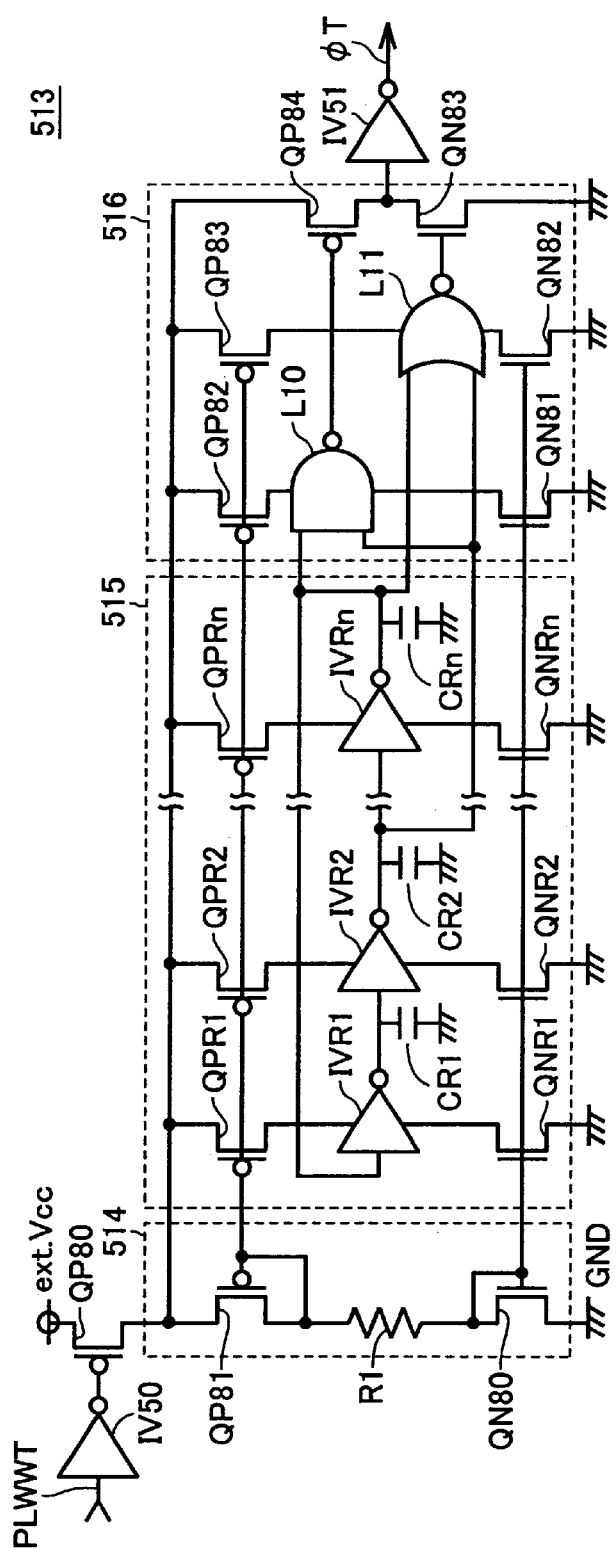
FIG. 9 is a circuit diagram showing the circuit configuration of a timer circuit shown in FIG. 8.

FIG. 9 is a circuit diagram showing the circuit configuration of timer circuit 513.

Referring to FIG. 9, timer circuit 513 includes an inverter IV50, a P-channel MOS transistor QP80, a current bias circuit 514, a ring oscillator 515, a buffer circuit 516 and an inverter IV51.

Transistor QP80 is connected between the node receiving external power-supply potential ext.Vcc and current bias circuit 514, and the gate thereof is connected to inverter IV50. Limiting circuit activation signal PLWWT is input into inverter IV50, which inverts the signal and outputs the inverted signal to transistor QP80.

Thus, when the limiting circuit activation signal PLWWT is activated (to the H level), i.e., when sub charge pump circuit 50 and sub charge pump limiting circuit 51 start operating, timer circuit 513 also starts its operation.

Current bias circuit 514 includes a P-channel MOS transistor QP81, a resistance element R1, and an N-channel MOS transistor QN80 connected in series. The source of transistor QP81 is connected to the drain of transistor QP80. Moreover, the source of transistor QN80 is connected to ground node GND. Each of transistors QP81 and QN80 is diode connected.

Ring oscillator 515 includes P-channel MOS transistors QPR1 to QPRn (n is an odd number), inverters IVR1 to IVRn, capacitors CR1 to CRn, and N-channel MOS transistors QNR1 to QNRn.

Transistor QPR1, inverter IVR1 and transistor QNR1 are connected in series. The source of transistor QPR1 is connected to the drain of transistor QP80, and the gate thereof is connected to the gate of transistor QP81. The source of transistor QNR1 is connected to ground node GND, and the gate thereof is connected to the gate of transistor QN80. Inverter IVR1 receives and inverts a signal output from inverter IVRn, and outputs the inverted signal to inverter IVR2. One end of capacitor CR1 is connected between inverter IVR1 and inverter IVR2, and the other end of capacitor CR1 is connected to ground node GND.

Similarly, transistor QPR2, inverter IVR2 and transistor QNR2 are connected in series. Inverter IVR2 inverts the output signal of inverter IVR1, and outputs the inverted signal to inverter IVR3. Capacitor CR2 has one end connected between inverter IVR2 and inverter IVR3 and the other end connected to ground node GND.

Connection of the other parts such as transistor QPRn, inverter IVRn, transistor QNRn and capacitor CRn are made in a similar manner, so that the description thereof will not be repeated.

Buffer circuit 516 includes P-channel MOS transistors QP82 to QP84, N-channel MOS transistors QN81 to QN83, and logic gates L10 and L11.

Transistor QP82, logic gate L10 and transistor QN81 are connected in series. The source of transistor QP82 is connected to the drain of transistor QP80, and the gate thereof is connected to the gate of transistor QP81. The source of transistor QN81 is connected to ground node GND, and the gate thereof is connected to the gate of transistor QN80.

Logic gate L10 receives an output signal from inverter IVR2 and an output signal from inverter IVRn, and outputs the result of an NAND operation of the received signals to the gate of transistor QP84.

Transistor QP83, logic gate L11 and transistor QN82 are connected in series. The source of transistor QP83 is connected to the drain of transistor QP80, and the gate thereof is connected to the gate of transistor QP81. The source of transistor QN82 is connected to ground node GND, and the gate thereof is connected to the gate of transistor QN80. Logic gate L11 receives the output signal from inverter IVR2 and the output signal from inverter IVRn, and outputs the result of an NOR operation of the received signals to the gate of transistor QN83.

Transistor QP84 and transistor QN83 are connected in series. The source of transistor QP84 is connected to the drain of transistor QP80. The source of transistor QN83 is connected to ground node GND.

Inverter IV51 is connected to the point connecting transistor QP84 and transistor QN83, and outputs a signal φT.

When sub charge pump limiting circuit 51 starts operating, signal φT output from timer circuit 513 is at the H level. After a predetermined time period determined by current bias circuit 514 and ring oscillator 515 has elapsed sine sub charge pump limiting circuit 51 started its operation, signal φT is lowered to the L level.

Figure 10:
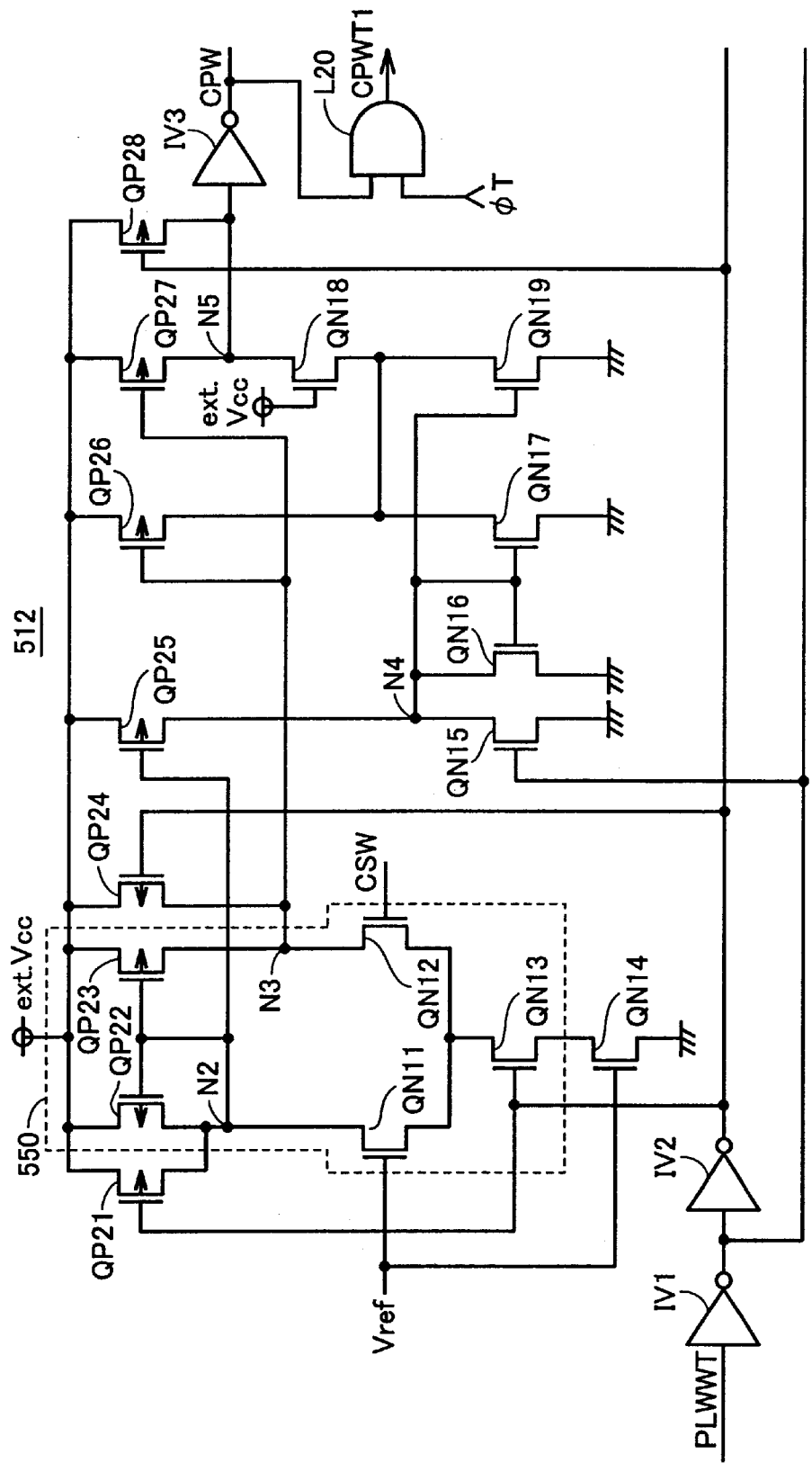
FIG. 10 is a circuit diagram showing the circuit configuration of a determination circuit shown in FIG. 8.

FIG. 10 is a circuit diagram showing the circuit configuration of determination circuit 512 shown in FIG. 8.

Referring to FIG. 10, comparing with determination circuit 511 shown in FIG. 5, a logic gate L20 is newly provided. Logic gate L20 receives determination signal CPW and signal φT output from timer circuit 513, and outputs the result of an AND logical operation as a stage-number changing signal CPWT1.

The other parts has the same circuit configuration as that shown in FIG. 5, so that the description thereof will not be repeated.

It is noted that the circuit configuration of sub boosting circuit 501 is as shown in FIG. 7, so that the description thereof will not be repeated. However, instead of stage increasing signal VWWP1, stage-number changing signal CPWT1 is input into sub boosting circuit 501.

The operation of sub charge pump circuit 50 and sub charge pump limiting circuit 51 having the circuit configuration above will be described below.

Now, it is assumed that the potential level of supply potential VWDP output from sub charge pump circuit 50 has not reached a predetermined potential level. Sub charge pump limiting circuit 51 then outputs determination signal CPW of the H level. When signal φT output from timer circuit 513 is at the H level, stage-number changing signal CPWT1 output from logic gate L20 within determination circuit 512 is at the H level. Thus, transistors QP56 and QP57 are turned on whereas transistor QP55 is turned off in sub boosting circuit 501. As a result, boosting operation is performed by four boosting stages B1 to B4 in sub boosting circuit 501.

Next, when signal φT output from the timer circuit is lowered to the L level, stage-number changing signal CPWT1 output from logic gate L20 within determination circuit 512 is lowered to be at the L level. Thus, transistors QP56 and QP57 are turned off whereas transistor QP55 is turned on in sub boosting circuit 501. As a result, boosting operation is performed by three boosting stages B1 to B3 in sub boosting circuit 501.

As a result, the number of boosting stages operated in sub boosting circuit 501 can be reduced from four to three stages after a predetermined time has elapsed since sub charge pump circuit 50 and sub charge pump limiting circuit 51 started their operation. Therefore, power consumption can be reduced.

Third Embodiment

Although the number of boosting stages operated within a sub boosting circuit is changed with respect to time in the second embodiment, the number of boosting stages to be operated may also be changed depending on the potential level of a boosted potential output from the main charge pump.

Figure 11:
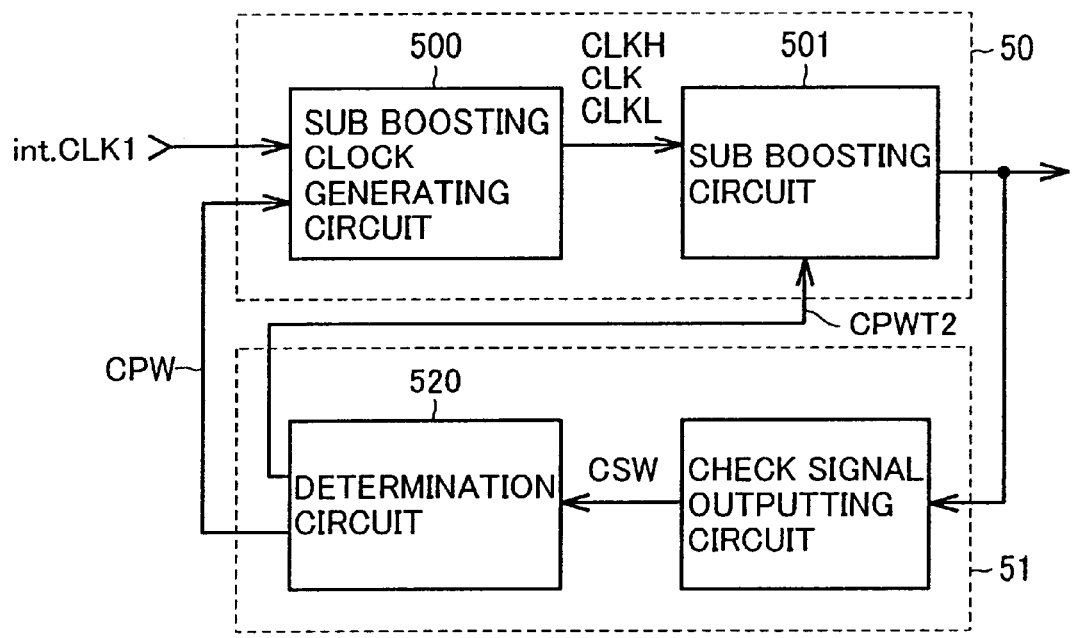
FIG. 11 is a block diagram showing the schematic configuration of a sub charge pump circuit and a sub charge pump limiting circuit according to the third embodiment.

FIG. 11 is a block diagram showing the schematic configuration of a sub charge pump circuit and a sub charge pump limiting circuit according to the third embodiment.

Sub charge pump circuit 50 has the same configuration as that shown in FIG. 3, and includes a sub boosting clock generating circuit 500 and a sub boosting circuit 501. However, instead of stage increasing signal VWWP1, a stage-number changing signal CPWT2 output from a determination circuit 520, which will be described later, is input into sub boosting circuit 501.

Sub charge pump limiting circuit 51 includes determination circuit 520 in place of determination circuit 511 in FIG. 3.

Figure 12:
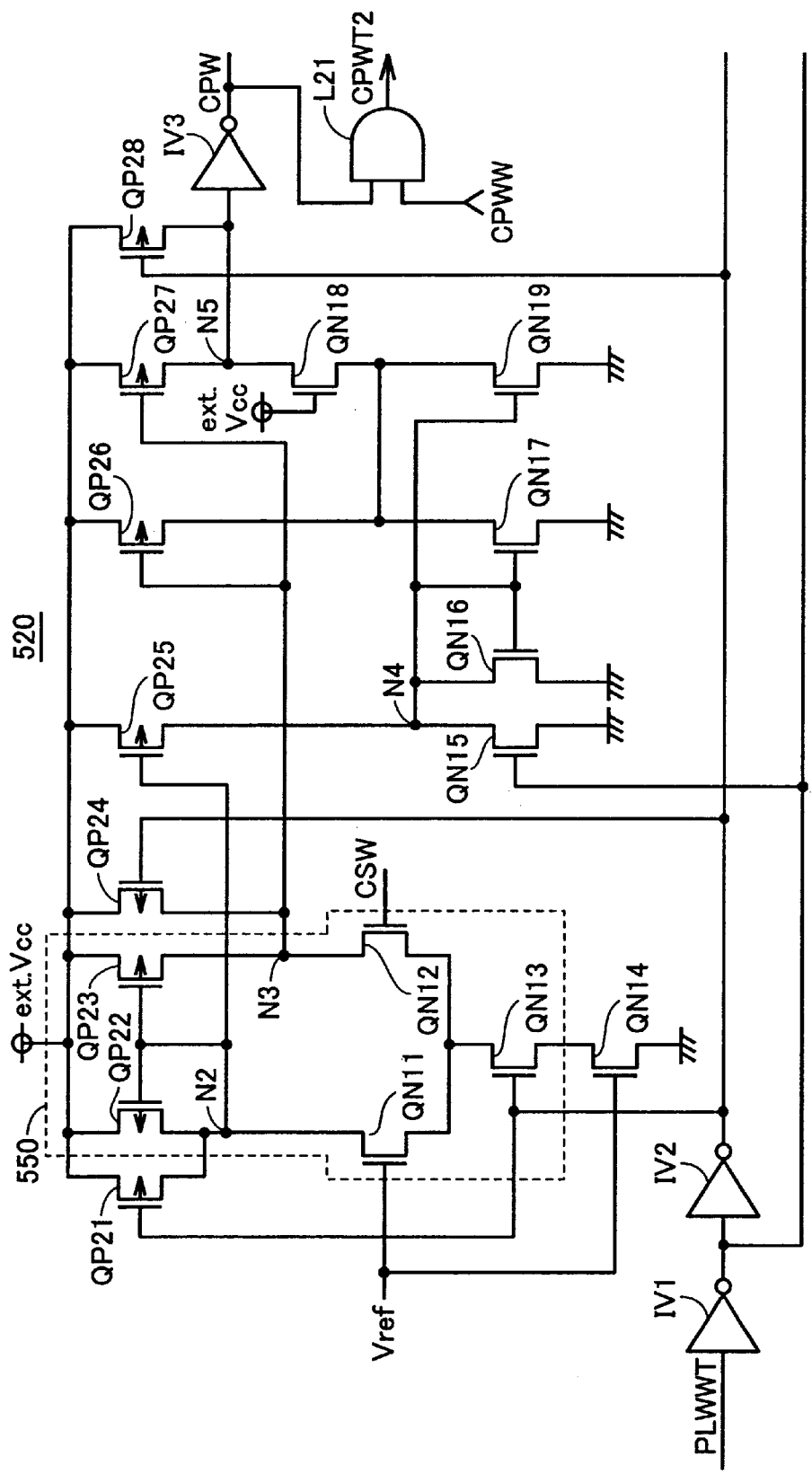
FIG. 12 is a circuit diagram showing the circuit configuration of a determination circuit.

FIG. 12 is a circuit diagram showing the circuit configuration of determination circuit 520.

Referring to FIG. 12, comparing with determination circuit 511 shown in FIG. 5, a logic gate L21 is additionally provided. Logic gate L21 receives determination signal CPW, and determination signal CPWW output from main charge pump limiting circuit 13 shown in FIG. 18, and outputs the result of an AND logical operation to sub boosting circuit 501 as a stage-number changing signal CPWT2.

The other parts have the same circuit configuration as shown in FIG. 5, so that the description thereof will not be repeated.

Sub charge pump circuit 50 and sub charge pump limiting circuit 51 having the circuit configuration described above will be described.

Now, it is assumed that the potential level of supply potential VWDP output from sub charge pump circuit 50 has not reached a predetermined potential level. Here, sub charge pump limiting circuit 51 outputs determination signal CPW of the H level. When determination signal CPWW output from main charge pump limiting circuit 13 shown in FIG. 8 is at the H level, i.e., when the potential level of boosted potential VPP output from main charge pump circuit 11 has not reached a predetermined potential level, stage-number changing signal CPWT2 output from logic gate L21 within determination circuit 520 is at the H level. Thus, transistors QP56 and QP57 are turned on, whereas transistor QP55 is turned off in sub boosting circuit 501. As a result, boosting operation is performed by four boosting stages B1 to B4 in sub boosting circuit 501.

Subsequently, when determination signal CPWW is at the H level, i.e., when the potential level of boosted potential VPP output from main charge pump circuit 11 has reached a predetermined potential level, stage-number changing signal CPWT2 output from logic gate L21 in determination circuit 520 is at the L level. Thus, transistors QP56 and QP57 are turned off, whereas transistor QP55 is turned on in sub boosting circuit 501. As a result, boosting operation is performed by three boosting stages B1 to B3 in sub boosting circuit 501.

As a result of the above, when boosted potential VPP output from main charge pump circuit 11 reaches a predetermined potential level, the number of boosting stages to be operated in sub boosting circuit 501 can be reduced from four to three stages. Therefore, power consumption can be reduced.

Fourth Embodiment

Figure 13:
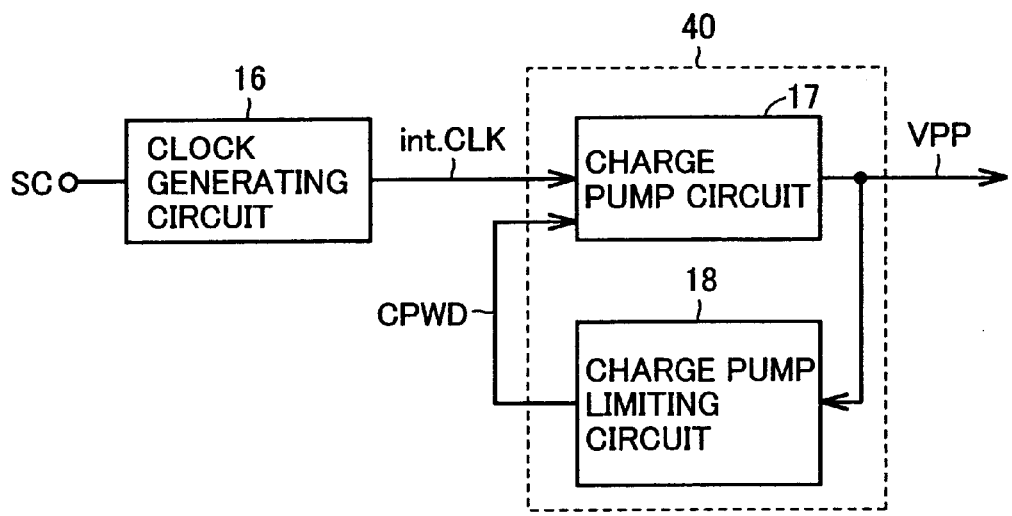
FIG. 13 is a block diagram showing the schematic configuration of a high voltage generating circuit and a clock generating circuit according to the fourth embodiment.

FIG. 13 is a block diagram showing the schematic configuration of a high voltage generating circuit and a clock generating circuit according to the fourth embodiment.

Referring to FIG. 13, a high voltage generating circuit 40 includes a charge pump circuit 17 and a charge pump limiting circuit 18.

Charge pump circuit 17 has the same circuit configuration as that of main charge pump circuit 11 shown in FIG. 18.

Moreover, charge pump limiting circuit 18 may have the same configuration as that of main charge pump limiting circuit 13 shown in FIG. 18, or that of sub charge pump limiting circuit 51 shown in FIG. 2.

Charge pump limiting circuit 18 receives boosted potential VPP output from charge pump circuit 17, determines whether or not boosted potential VPP has reached at a predetermined potential level, and outputs the result of the determination as a determination signal CPWD. If it is determined that boosted potential VPP has not yet reached a predetermined potential level, charge pump limiting circuit 18 outputs determination signal CPWD of the H level. On the other hand, if it is determined that boosted potential VPP has reached at a predetermined potential level, determination signal CPWD is set to be at the L level.

Internal clock signal int.CLK is input from clock generating circuit 16 into high voltage generating circuit 40.

When determination signal CPWD is at the H level, charge pump circuit 17 boosts the potential level in accordance with a change in the frequency of internal clock signal int.CLK, and outputs boosted potential VPP. Whereas, when determination signal CPWD is at the L level, or when internal clock signal int. CLK is always set to be at the L level, charge pump circuit 17 performs no boosting operation.

Figure 14:
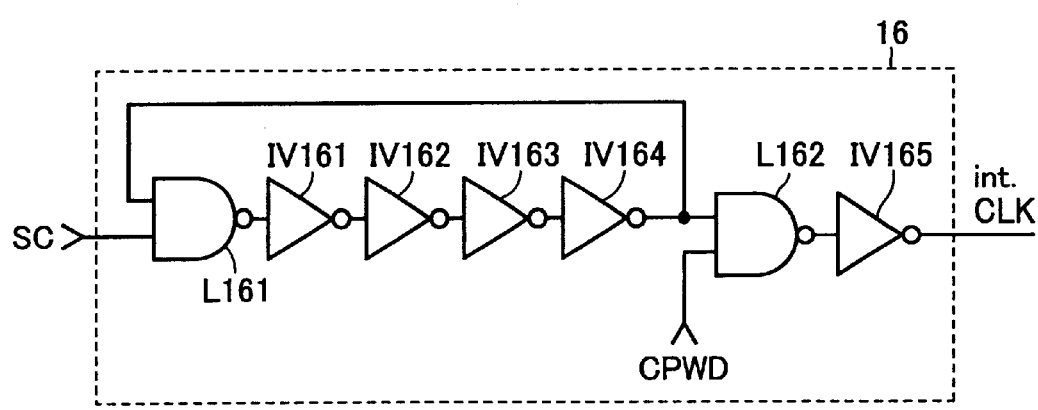
FIG. 14 is a circuit diagram showing the circuit configuration of a clock generating circuit shown in FIG. 13.

FIG. 14 is a circuit diagram showing the circuit configuration of clock generating circuit shown in FIG. 13.

Referring to FIG. 14, clock generating circuit 16 includes inverters IV161 to IV165, and logic gates L161 and L162.

Logic gate L161 and inverters IV161 to IV164 are connected in series to constitute a ring oscillator. Logic gate L161 receives an externally-input serial clock signal SC and an output signal of inverter IV164, and outputs the result of an NAND logical operation. Each of inverters IV161 to IV164 inverts a received signal and outputs the inverted signal.

Logic gate L162 receives the output signal of inverter IV164 and determination signal CPWD output from charge pump limiting circuit 18, and outputs the result of an NAND logical operation. Inverter IV165 receives and inverts the output signal of logic gate L162, and outputs the inverted signal as internal clock signal int.CLK.

The operation of high voltage generating circuit 40 having the circuit configuration described above will be described.

When determination signal CPWD output from charge pump limiting circuit 18 is set to be at the H level, i.e., when boosted potential VPP has not reached a predetermined potential level, logic gate L162 within clock generating circuit 16 alternately outputs signals of the H and L levels in accordance with the signal output from inverter IV164.

Thus, internal clock signal int.CLK output from inverter IV165 alternately repeats the H level and L level.

On the other hand, when determination signal CPWD output from charge pump limiting circuit 18 is lowered to the L level, i.e., when boosted potential VPP has reached a predetermined potential level, logic gate L162 within the clock generating circuit always outputs a signal of the H level. Thus, internal clock signal int.CLK output from inverter IV165 is always set to be at the L level.

Accordingly, charge pump circuit 17 stops its operation. As a result, the potential level of boosted potential VPP is not boosted.

By the operation described above, when boosted potential VPP has reached a predetermined potential level, the clock generating circuit stops its operation in addition to the charge pump circuit stopping its operation. Therefore, power consumption can be reduced.

Fifth Embodiment

Although the fourth embodiment described the reduction of power consumption for the case where a high voltage generating circuit and a charge pump limiting circuit are provided, the power consumption can also be reduced when a plurality of high voltage generating circuits are provided.

Figure 15:
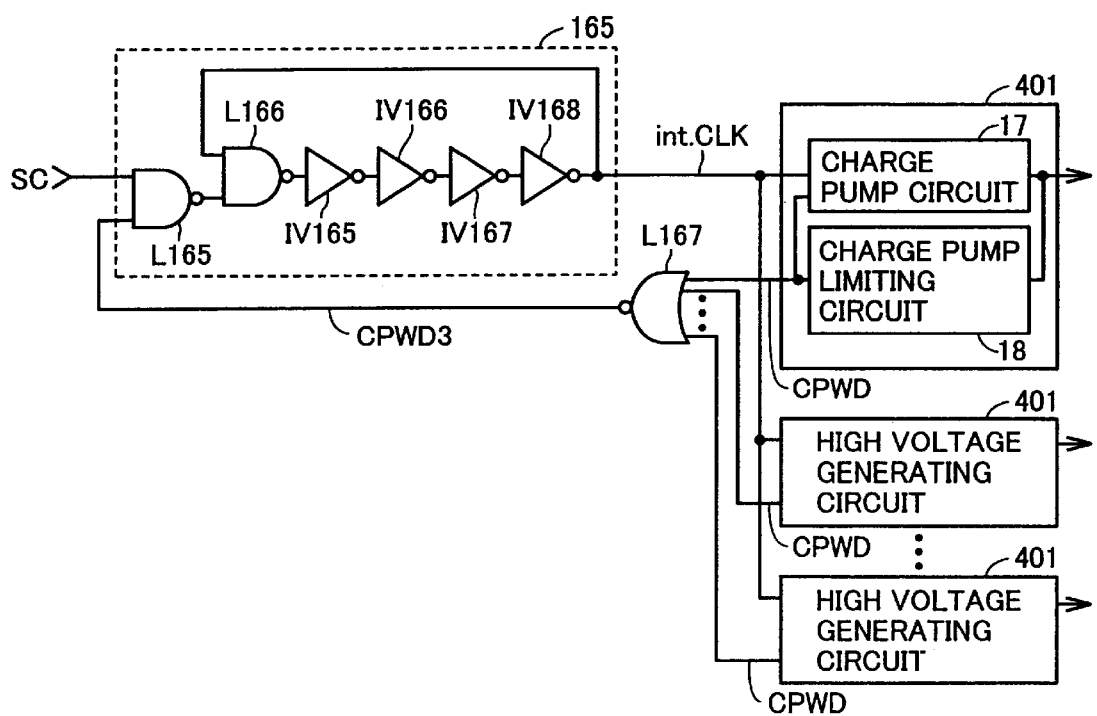
FIG. 15 is a block diagram showing the schematic configuration of a high voltage generating circuit and a clock generating circuit according to the fifth embodiment.

FIG. 15 is a block diagram showing the schematic configuration of high voltage generating circuits and a clock generating circuit according to the fifth embodiment.

Referring to FIG. 15, internal clock signal int.CLK output from clock generating circuit 165 is input into a plurality of high voltage generating circuits 401.

High voltage generating circuit 401 includes a charge pump circuit 17 and a charge pump limiting circuit 18. Charge pump limiting circuit 18 outputs determination signal CPWD.

Logic gate L167 receives all of determination signals CPWD output from the plurality of high voltage generating circuit 401, and outputs the result of an NOR logical operation as a signal CPWD3.

Clock generating circuit 165 includes logic gates L165, L166, and inverters IV165 to IV168.

Logic gate L165 receives serial clock signal SC, i.e. an external signal, and signal CPWD3 output from logic gate L166, and outputs the result of an NAND logical operation.

Logic gate L166 and inverters IV165 to IV168 are connected in series to constitute a ring oscillator. Logic gate L166 receives a signal output from logic gate L165 and an output signal of inverter IV168, and outputs the result of an NAND logical operation thereof. Inverters IV165 to IV168 invert the received signals and output the inverted signals respectively. Inverter IV168 outputs the inverted signal as internal clock signal int.CLK.

The operation of clock generating circuit 165 having the circuit configuration described above will be described.

When any one of determination signals CPWD output from the plurality of high voltage generating circuits 401 is at the H level, i.e., when any one of boosted potentials VPP output from the high voltage generating circuits has not yet reached a predetermined potential level, signal CPWD3 output from logic gate L167 is at the L level.

Thus, logic gate L165 within clock generating circuit 165 outputs a signal of the H level. As a result, internal clock signal int.CLK output from clock generating circuit 165 alternately repeats the H level and L level.

Next, when all of determination signals CPVVD output from the plurality of high voltage generating circuits 401 are at the L level, i.e., when all of boosted potentials VPP output from the high voltage generating circuits have reached a predetermined potential level, signal CPWD3 is at the H level.

Thus, logic gate L165 within clock generating circuit 165 outputs a signal of the L level. As a result, logic gate L166 always outputs a signal of the H level, and internal clock signal int.CLK output from dock generating circuit 165 is always set to be at the L level.

As described above, the operation of clock generating circuit 165 is stopped when all of the boosted potentials output from the plurality of high voltage generating circuits 401 have reached a predetermined potential level. Therefore, power consumption can be reduced.

Sixth Embodiment

Figure 16:
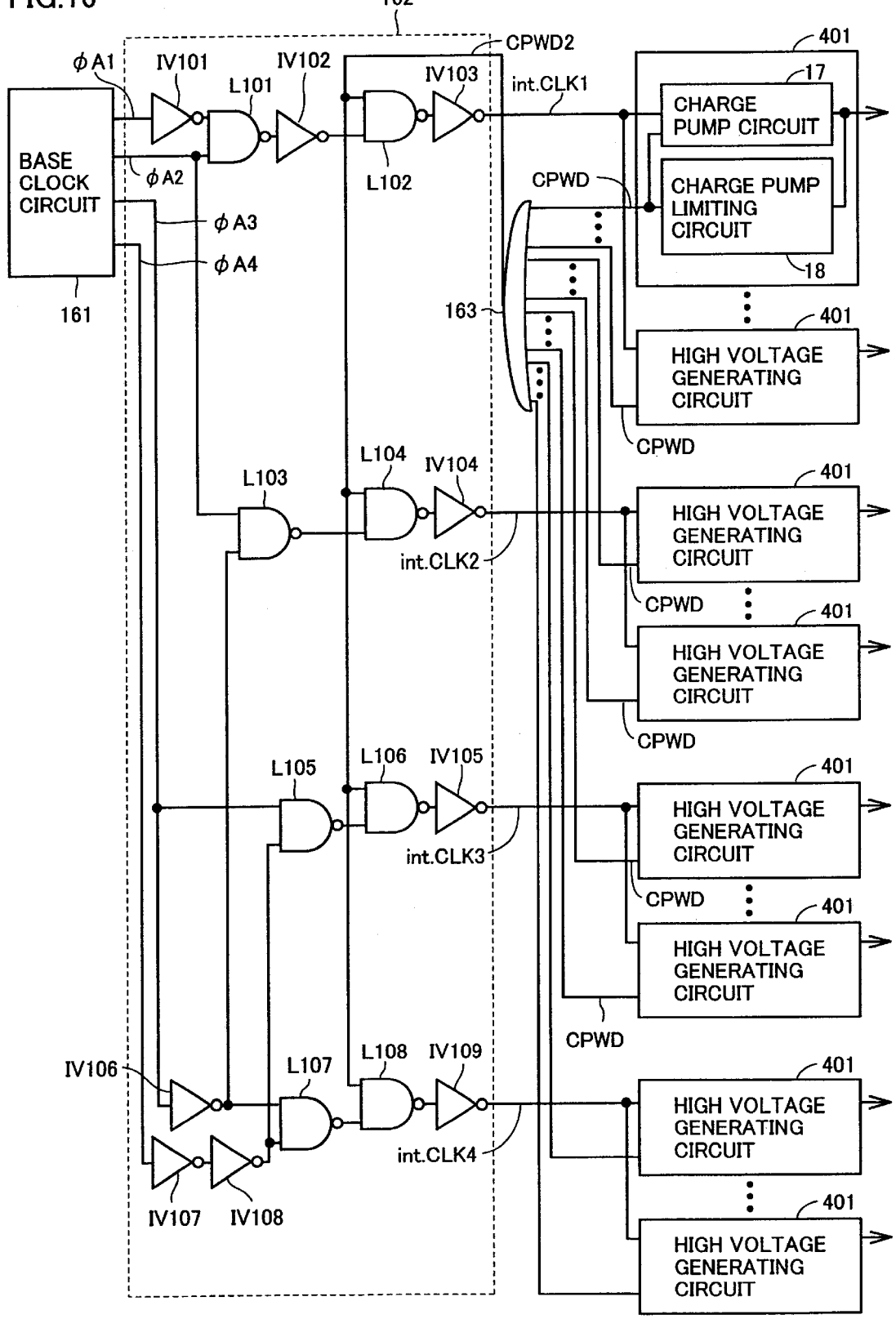
FIG. 16 is a block diagram showing the schematic configuration of a high voltage generating circuit and a clock generating circuit according to the sixth embodiment.

FIG. 16 is a block diagram showing the schematic configuration of high voltage generating circuits and a clock generating circuit.

Referring to FIG. 16, the clock generating circuit includes a base clock generating circuit 161 outputting signals φA1 to φA4 which are to be the base for generating internal clock signal int. CLK, and a clock frequency-dividing circuit 162 generating a plurality of internal clock signals int.CLK1 to int.CLK4 having different frequencies.

High voltage generating circuit 401 includes charge pump circuit 17 and charge pump limiting circuit 18. Moreover, there are plurality of high voltage generating circuits 401 receiving internal clock signal int.CLK1 output from clock freqnecy-deviding circuit 162. Likewise, there are a plurality of high voltage generating circuits 401 receiving each of internal clock signals int.CLK2, int.CLK3 and int.CLK4.

All determination signals CPWD output from charge pump limiting circuit 18 within the plurality of high voltage generating circuit 401 are input into logic gate L163.

Logic gate L163 receives a plurality of determination signals, CPWD, and outputs the result of an OR logical operation to clock frequency-dividing circuit 162 as a signal CPWD2.

Clock frequency-dividing circuit 162 includes inverters IV101 to IV109, and logic gates L101 to L108. Inverter IV101 receives and inverts signal φA1, and transmits the inverted signal. Logic gate L101 receives an output signal of inverter IV101 and signal φA2, and outputs the result of an NAND logical operation. Inverter IV102 receives and inverts the output signal of logic gate L101, and transmits the inverted signal. Logic gate L102 receives the output signal of inverter IV102 and signal CPWD2 output from logic gate L163, and outputs the result of an NAND logical operation. Inverter IV103 receives and inverts the output signal of logic gate L102, and outputs the inverted signal as internal clock signal int.CLK1.

Inverter IV106 receives and inverts signal φA3, and transmits the inverted signal. Logic gate L103 receives signal φA2 and a signal output from inverter IV106, and outputs the result of an NAND logical operation of the received signals. Logic gate 104 receives the output signal of logic gate L103 and output signal CPWD2 of logic gate L163, and outputs the result of an NAND logical operation. Inverter IV104 receives and inverts the output signal of logic gate L104, and outputs the inverted signal as an internal clock signal int.CLK2.

Inverter IV107 receives and inverts signal φA4, and outputs the inverted signal. Moreover, inverter IV108 receives and inverts the output signal of inverter IV107, and outputs the inverted signal. Logic gate L105 receives signal φA3 and the output signal of inverter IV108, and outputs the result of an NAND logical operation of the received signals. Logic gate L106 receives the output signal of logic gate L105 and output signal CPWD2 of logic gate L163, and outputs the result of an NAND logical operation. Inverter IV105 receives and inverts the output signal of logic gate L106, and outputs the inverted signal as an internal clock signal int.CLK3.

Logic gate L107 outputs the result of an NAND logical operation of the output signal of inverter IV106 and the output signal of inverter IV108. Logic gate L108 receives the output signal of logic gate L107 and output signal CPWD2 of logic gate L163, and outputs the result of an NAND logical operation. Inverter IV109 receives and inverts the output signal of logic gate L108, and outputs the inverted signal as an internal clock signal int.CLK4.

The operation of the clock frequency-dividing circuit having the circuit configuration above will be described.

When any one of the plurality of determination signals CPWD output from high voltage generating circuits 401 is at the L level, the signal output from logic gate L163 is at the H level. Thus, clock frequency-dividing circuit 162 outputs internal clock signals int.CLK1 to int.CLK4 in accordance with signals φA1 to φA4 output from base clock generating circuit 101, respectively.

Whereas, when all of the plurality of determination signals CPWD output from high voltage generating circuits 401 are at the L level, i.e., when the potential level of boosted potentials VPP output from all of high voltage generating circuits 401 have reached a predetermined potential level, the signal output from logic gate L163 is at the L level. Thus, the signals output from logic gates L102, L104, L106 and L108 within clock frequency-dividing circuit 162 are always at the L level. As a result, internal clock signals int.CLK1 to int.CLK4 output from clock frequency-dividing circuit 162 are all at the L level.

As a result of the above, when boosted potentials VPP output from all of high-voltage generating circuits 401 have attained a predetermined potential level, clock frequency-dividing circuit 162 stops its operation. Therefore, power consumption can be reduced.

Seventh Embodiment

Figure 17:
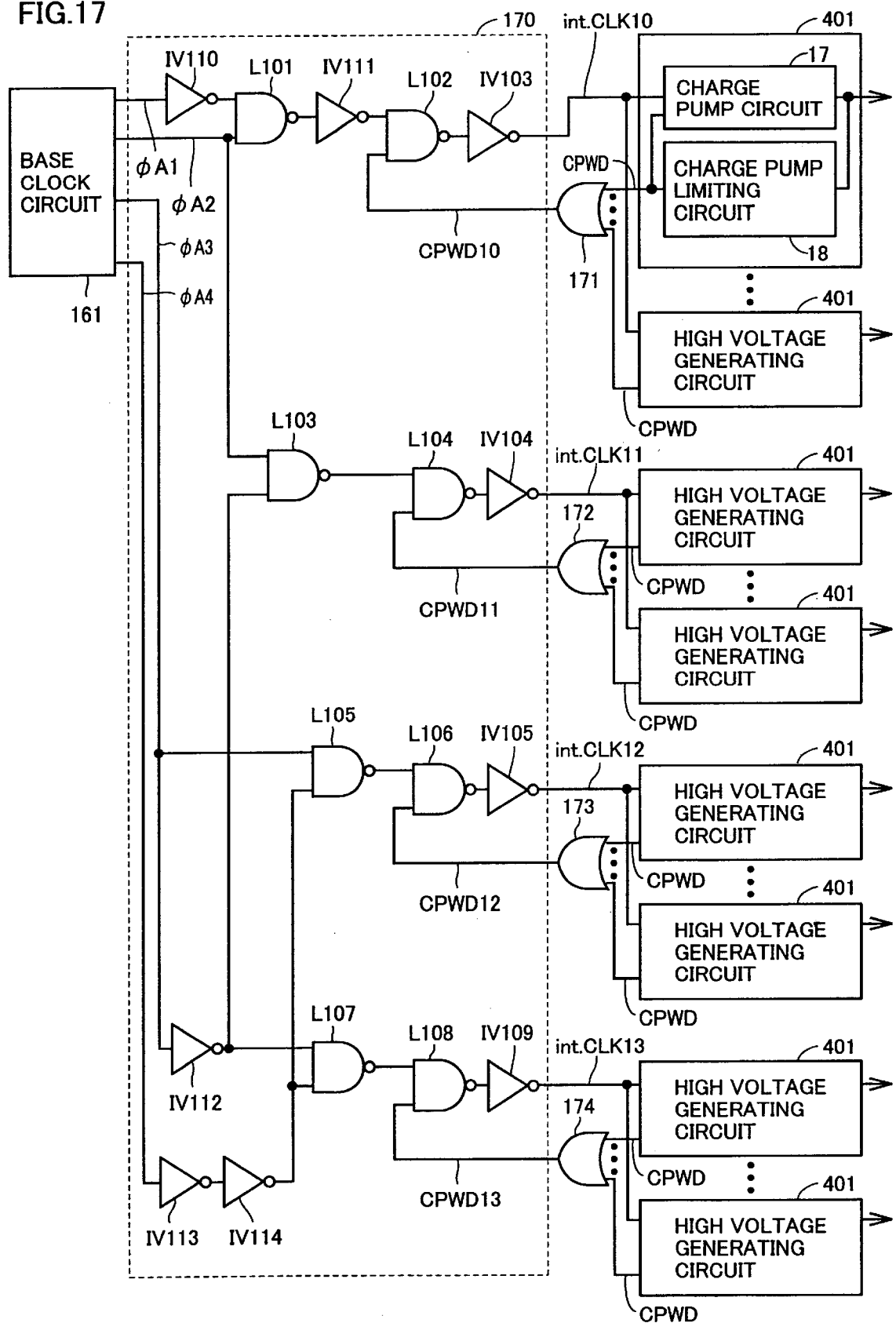
FIG. 17 is a block diagram showing the schematic configuration of a high voltage generating circuit and a clock generating circuit according to the seventh embodiment.

FIG. 17 is a block diagram showing the schematic configuration of high-voltage generating circuits and a clock generating circuit according to the seventh embodiment.

Referring to FIG. 17, the clock generating circuit includes a base clock generating circuit 161 outputting signals φA1 to φA4 which are to be the base for generating internal clock signal int.CLK, and a clock frequency-dividing circuit 170 generating a plurality of internal clock signals int.CLK 10 to int. CLK13 having different frequencies, in accordance with signals φA1 to φA4.

High voltage generating circuit 401 includes charge pump circuit 17 and charge pump limiting circuit 18. Moreover, a plurality of high voltage generating circuit 401 are provided to receive internal clock signal int.CLK10 output from clock frequency-dividing circuit 170. Similarly, a plurality of high voltage generating circuits 401 are provided to receive each of internal clock signals int.CLK11, int.CLK12 and int.CLK13.

Determination signals CPWD output from the plurality of high voltage generating circuits 401 receiving internal clock signal int.CLK 10 are input into a logic gate L171. Logic gate L171 receives the plurality of determination signals CPWD, and outputs the result of an OR logical operation to clock frequency-dividing circuit 170 as a signal CPWD10.

Clock frequency-dividing circuit 170 includes inverters IV103 to IV105, IV109 to IV114, and logic gates L101 to L108. Inverter IV110 receives and inverts signal φA1, and transmits the inverted signal. Logic gate L101 receives the output signal of inverter IV110 and signal φA2, and outputs the result of an NAND logical operation. Inverter IV111 receives and inverts the output signal of logic gate L101, and transmits the inverted signal. Logic gate L102 receives the output signal of inverter IV111 and signal CPWD10 output from logic gate L171, and outputs the result of an NAND logical operation. Inverter IV103 receives and inverts the output signal of logic gate L101, and outputs the inverted signal as internal clock signal int.CLK10.

Inverter IV112 receives and inverts signal φA3, and transmits the inverted signal. Logic gate L103 receives signal φA2 and the signal output from inverter IV112, and outputs the result of an NAND logical operation. Loic gate L104 receives the output signal of logic gate L103 and an output signal CPWD11 of a logic gate L172, and outputs the result of an NAND logical operation. Inverter IV104 receives and inverts the output signal of logic gate L104, and outputs the inverted signal as internal clock signal int.CLK11.

Inverter IV113 receives and inverts signal φA4, and outputs the inverted signal. Furthermore, inverter IV114 receives and inverts the output signal of inverter IV113, and outputs the inverted signal. Logic gate L105 receives signal φA3 and the output signal of inverter IV114, and outputs the result of an NAND logical operation. Logic gate L106 receives the output signal of logic gate L105 and an output signal CPWD12 of a logic gate L173, and outputs the result of an NAND logical operation. Inverter IV105 receives and inverts the output signal of logic gate L106, and outputs the inverted signal as internal clock signal int.CLK12.

Logic gate L107 outputs the result of an NAND logical operation of the output signal of inverter IV112 and the output signal of inverter IV114. Logic gate L108 receives the output signal of logic gate L107 and an output signal CPWD13 of a logic gate L174, and outputs the result of an NAND logical operation. Inverter IV109 receives and inverts the output signal of logic gate L108, and outputs the inverted signal as internal clock signal int. CLK13.

The operation of the clock frequency-dividing circuit having the circuit configuration above will be described.

First, reference is made to the plurality of high voltage generating circuits 401 receiving internal clock signal int.CLK10 from clock frequency-dividing circuit 170.

When any one of the plurality of determination signals CPWD is at the H level, the signal output from logic gate L170 is also at the H level. Thus, internal clock signal int.CLK10 output from logic gate L102 within clock frequency-dividing circuit 170 alternately repeats the H level and L level.

When all of the plurality of determination signals CPWD are at the L level, i.e., when the potential level of boosted potentials VPP output from high voltage generating circuits 401 receiving internal clock signal int.CLK10 have attained a predetermined potential level, the signal output from logic gate L171 is at the L level. Thus, internal clock signal int.CLK10 output from logic gate L102 within clock frequency-dividing circuit 162 is always at the L level.

As a result of the above, when all of boosted potentials VPP have reached a predetermined potential level in the plurality of high voltage generating circuits 401 receiving internal clock signal int.CLK10, clock frequency-dividing circuit 170 stops outputting internal clock signals int.CLK10.

The plurality of high voltage generating circuits 401 receiving internal clock signal int.CLK11 operate in a similar manner, and the plurality of high voltage generating circuits 401 receiving internal clock signals int.CLK12 and those receiving int.CLK13 also operate in a similar manner, so that the description thereof will not be repeated.

As a result of the above, in a plurality of high voltage generating circuits receiving different internal clock signals, a clock frequency-dividing circuit stops generating an internal clock signal thereof, when all of boosted potentials output from the plurality of high voltage generating circuits receiving the same internal clock signal have attained a predetermined potential level. Therefore, power consumption can be reduced. Furthermore, generation of an internal clock signal can be stopped for each group of the high voltage generating circuits receiving an identical internal clock signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor integrated circuit device, comprising:

a plurality of boosters, each booster boosting a respective internal potential;

a plurality of determination circuits corresponding to said plurality of boosters, each determination circuit determining whether or not the internal potential boosted by each corresponding booster is at a respective predetermined potential; and a clock generating circuit receiving an external signal and generating an internal clock signal, said clock generating circuit stopping generation of said internal clock signal when each of said determination circuits determines that the potential boosted by each of said boosters is at its respective predetermined potential.

2. The semiconductor integrated circuit device according to claim 1, wherein said clock generating circuit receives an activation signal generated from an external signal to start operation, and invalidates said activation signal when each of said determination circuits determines that the potential boosted by each of said boosters is at a predetermined potential.

3. The semiconductor integrated circuit device according to claim 2, wherein said clock generating circuit includes a plurality of clock frequency-dividing circuits each changing a frequency of said clock signal, and each of said clock frequency-dividing circuits invalidates said activation signal when each of the potential levels boosted by said plurality of boosters each receiving said clock signal of a same frequency is at a predetermined potential.

* * * * *

UNITED STATES PATENT AND TRADEMARK OFFICE
CERTIFICATE OF CORRECTION

PATENT NO.   : 6,646,494 B2
DATED        : November 11, 2003
INVENTOR(S)  : Yoshitsugu Dohi et al.

It is certified that error appears in the above-identified patent and that said Letters Patent is hereby corrected as shown below:

<u>Title Page,</u>
Item [73], Assignee, change "Mitsubishi Denki Kabushiki Kaisha" to
-- Renesas Technology, Corp. --

Signed and Sealed this

Twenty-fifth Day of May, 2004

JON W. DUDAS
*Acting Director of the United States Patent and Trademark Office*